US007017650B2

(12) United States Patent
Johnson, Jr. et al.

(10) Patent No.: US 7,017,650 B2
(45) Date of Patent: *Mar. 28, 2006

(54) EARTH LOOP ENERGY SYSTEMS

(75) Inventors: Howard E. Johnson, Jr., Kennesaw, GA (US); Gregory R. Tinkler, Houston, TX (US); Thomas R. Amerman, Houston, TX (US)

(73) Assignee: Enlink Geoenergy Services, Inc., Houston, TX (US)

( * ) Notice: Subject to any disclaimer, the term of this patent is extended or adjusted under 35 U.S.C. 154(b) by 266 days.

This patent is subject to a terminal disclaimer.

(21) Appl. No.: 10/387,125

(22) Filed: Mar. 12, 2003

(65) Prior Publication Data
US 2004/0031585 A1 Feb. 19, 2004

Related U.S. Application Data

(60) Continuation-in-part of application No. 09/930,385, filed on Aug. 15, 2001, now Pat. No. 6,585,036, which is a continuation-in-part of application No. 09/459,416, filed on Dec. 12, 1999, now Pat. No. 6,250,371, which is a continuation-in-part of application No. 09/237,754, filed on Jan. 26, 1999, now Pat. No. 6,672,371, which is a continuation-in-part of application No. 09/087,705, filed on Jun. 1, 1998, now Pat. No. 6,041,862, which is a continuation-in-part of application No. 08/779,812, filed on Jan. 6, 1997, now Pat. No. 5,758,224, which is a division of application No. 08/527,114, filed on Sep. 12, 1995, now Pat. No. 5,590,715.

(51) Int. Cl.
*F28D 7/00* (2006.01)

(52) U.S. Cl. ............................ 165/45; 166/57; 166/302; 62/260; 73/152.13; 73/152.33

(58) Field of Classification Search .................. 165/45; 62/260

See application file for complete search history.

(56) References Cited

U.S. PATENT DOCUMENTS

| | | | |
|---|---|---|---|
| 2,050,970 A | 8/1936 | Hughes | 166/13 |
| 2,251,916 A | 8/1941 | Cross | 262/3 |
| 2,994,381 A | 8/1961 | Brown | 166/224 |
| 3,030,086 A | 4/1962 | Donaldson et al. | 262/1 |
| 3,249,162 A | 5/1966 | Brown | 175/96 |
| 3,312,296 A | 4/1967 | Paramore et al. | 175/72 |

(Continued)

FOREIGN PATENT DOCUMENTS

CH           A-653120           12/1985

(Continued)

OTHER PUBLICATIONS

"Grout Placement Methods," Chapter 4 of Grouting Procedures For ground Source Heat Pump Systems, Eckhart, 1991.

(Continued)

*Primary Examiner*—Terrell Mckinnon
(74) *Attorney, Agent, or Firm*—Guy McClung

(57) ABSTRACT

Wellbore heat loop systems, fillers for bores in the systems, and methods of the use of such systems; the systems in certain aspects having a heat loop wellbore in the earth having heat loop pipe extending down to one side of a bottom member and up therefrom on another side thereof, the bottom member in certain aspects having a body with first and second bores therethrough, the second bore sized and configured for securement thereat of an end of coil tubing; and, in certain aspects, filler material around the heat loop in the wellbore with a gel material mixed with the water.

19 Claims, 15 Drawing Sheets

U.S. PATENT DOCUMENTS

| | | | |
|---|---|---|---|
| 3,489,222 A | 1/1970 | Millhone et al. | 166/290 |
| 3,525,406 A | 8/1970 | Hart | 175/26 |
| 3,593,797 A | 7/1971 | Lebourg | 166/290 |
| 3,609,980 A | 10/1971 | Bowers | 165/45 |
| 3,727,459 A | 4/1973 | Buettner | 73/205 |
| 3,878,686 A | 4/1975 | Hageman et al. | 405/264 |
| 3,979,917 A | 9/1976 | Crafton | 61/42 |
| 4,042,012 A | 8/1977 | Perry et al. | 165/1 |
| 4,050,509 A | 9/1977 | Bienert et al. | 165/45 |
| 4,084,648 A | 4/1978 | Yahiro et al. | 175/67 |
| 4,213,119 A | 7/1980 | Ward et al. | 340/151 |
| 4,270,600 A | 6/1981 | Bourdin | 165/45 |
| 4,286,651 A | 9/1981 | Steiger et al. | 165/45 |
| 4,306,293 A | 12/1981 | Marathe | 364/557 |
| 4,325,228 A | 4/1982 | Wolf | 165/45 |
| 4,360,056 A | 11/1982 | O'Connell | 165/45 |
| 4,363,441 A | 12/1982 | Feinberg | 165/11 |
| 4,441,556 A | 4/1984 | Powers et al. | 166/290 |
| 4,448,237 A | 5/1984 | Riley | 165/2 |
| 4,493,592 A | 1/1985 | Knox | 405/225 |
| 4,574,875 A | 3/1986 | Rawlings et al. | 165/45 |
| 4,595,059 A | 6/1986 | Katagiri et al. | 166/290 |
| 4,618,266 A | 10/1986 | Feller | 165/47 |
| 4,661,018 A | 4/1987 | Kinnan | 405/178 |
| 4,662,448 A | 5/1987 | Ashford et al. | 166/290 |
| 4,700,788 A | 10/1987 | Langer | 175/61 |
| 4,714,108 A | 12/1987 | Barry | 165/45 |
| 4,715,429 A | 12/1987 | Mogensen | 165/45 |
| 4,718,478 A | 1/1988 | Huber | 165/11 |
| 4,720,263 A | 1/1988 | Green | 432/222 |
| 4,782,888 A | 11/1988 | Bardenheier | 165/22 |
| 4,905,777 A | 3/1990 | Spies | 175/73 |
| 4,909,323 A | 3/1990 | Hastings | 166/242.3 |
| 4,912,941 A | 4/1990 | Büchi | 165/45 |
| 4,927,294 A | 5/1990 | Magnani et al. | 405/177 |
| 4,964,474 A | 10/1990 | Poesch | 175/74 |
| 4,981,396 A | 1/1991 | Albertson et al. | 405/178 |
| 4,993,483 A | 2/1991 | Harris | 165/45 |
| 5,040,926 A | 8/1991 | Andreasson | 405/232 |
| 5,129,236 A | 7/1992 | Solomon | 62/324.1 |
| 5,183,100 A | 2/1993 | Harrell, Jr. | 165/45 |
| 5,244,037 A | 9/1993 | Warnke | 165/104.31 |
| 5,244,046 A | 9/1993 | Council et al. | 166/380 |
| 5,261,251 A | 11/1993 | Galiyano | 62/176.6 |
| 5,291,956 A | 3/1994 | Mueller et al. | 175/67 |
| 5,322,115 A | 6/1994 | Hildebrand | 165/45 |
| 5,411,085 A | 5/1995 | Moore et al. | 166/242 |
| 5,435,387 A | 7/1995 | Roberts | 166/242 |
| 5,435,395 A | 7/1995 | Connell | 166/384 |
| 5,452,853 A | 9/1995 | Shook et al. | 239/7 |
| 5,454,419 A | 10/1995 | Vloedman | 166/277 |
| 5,477,914 A | 12/1995 | Rawlings | 165/45 |
| 5,502,652 A | 3/1996 | Hoggatt et al. | 165/22 |
| 5,533,356 A | 7/1996 | DeMasters | 62/260 |
| 5,560,220 A | 10/1996 | Cochran | 165/45 |
| 5,598,706 A | 2/1997 | Bronicki et al. | 606/641.2 |
| 5,598,866 A | 2/1997 | Nelson | 137/355.12 |
| 5,623,986 A | 4/1997 | Wiggs | 165/45 |
| 5,706,888 A | 1/1998 | Ambs et al. | 166/155 |
| 5,752,572 A | 5/1998 | Baiden et al. | 175/26 |
| 5,762,142 A | 6/1998 | Connell et al. | 166/325 |
| 5,765,643 A | 6/1998 | Shaaban et al. | 166/384 |
| 5,791,378 A | 8/1998 | Stephens | 138/98 |
| 5,791,380 A | 8/1998 | Onan et al. | 138/149 |
| 5,933,355 A | 8/1999 | Deb | 364/483 |

FOREIGN PATENT DOCUMENTS

| | | | |
|---|---|---|---|
| DE | A-3009572 | 9/1981 | |
| DE | A-3114262 | 11/1982 | |
| DE | A-3913429 | 11/1989 | |
| DE | U-9403070 | 7/1994 | |
| EP | 221618 | 5/1986 | 236/51 |
| JP | 4-103948 | 4/1986 | 165/202 |
| JP | 61-208521 | 9/1986 | 236/46 R |
| JP | 62-116844 | 5/1987 | 236/38 |

OTHER PUBLICATIONS

"Driscopipe 5300 Climate Guard System," Phillips Driscopipe, Inc. 1994.

U.S. PTO Official Gazette entry for U.S. Patent 5,427,154 Jun. 27, 1995; p. 2218.

U.S. Official Gazette entry; U.S. 5,671,608; Sep. 30, 1997.

U.S. Official Gazette entry; U.S. 5,551,644; Sep. 3, 1996.

U.S. Official Gazette entry; U.S. 5,551,647; Sep. 3, 1996.

New Rigs and Accessories: Drive To Grow Ground Source Heat Pump Market Stimulates Drilling Technology Development, Swanson, Water Well Journal, vol. L, No. 10, Oct. 1996, pp. 33-37.

Invitation to pay additional fees in PCT/GB99/01521 and annex thereto.

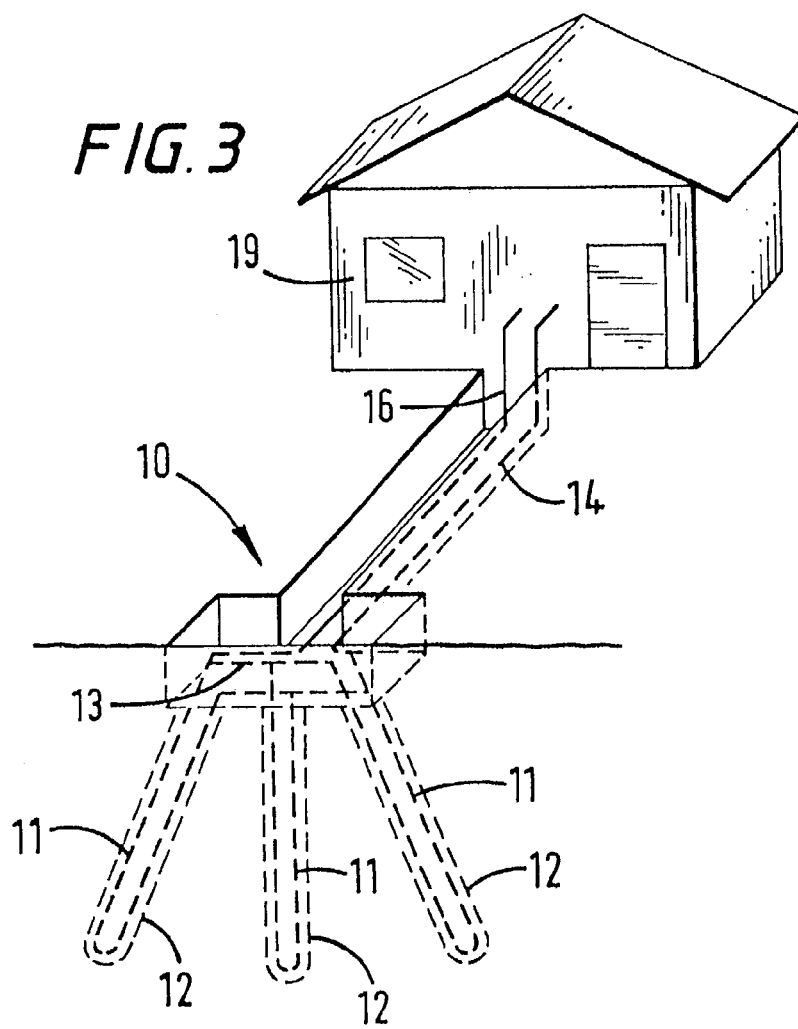
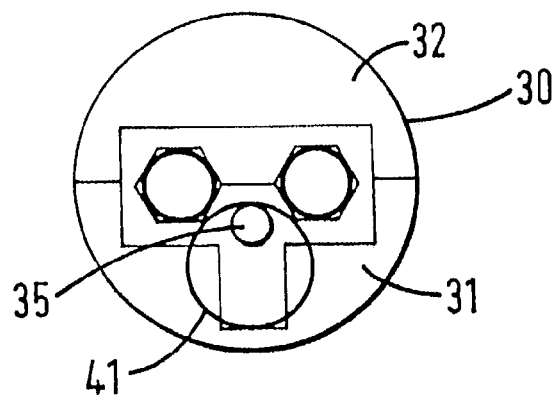
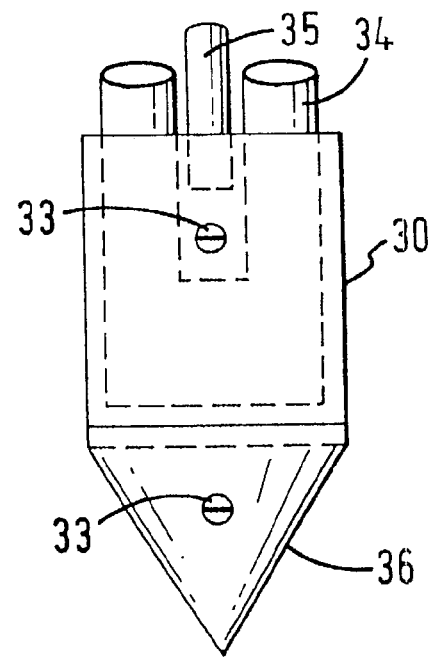

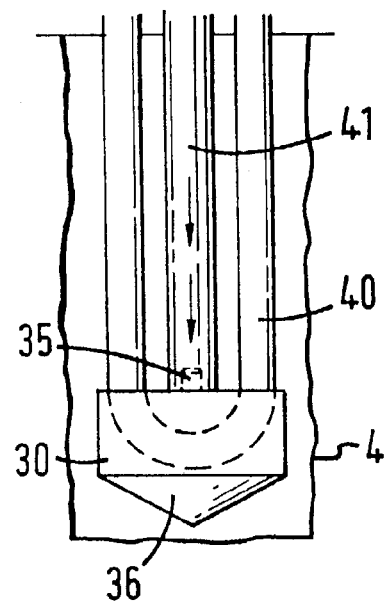
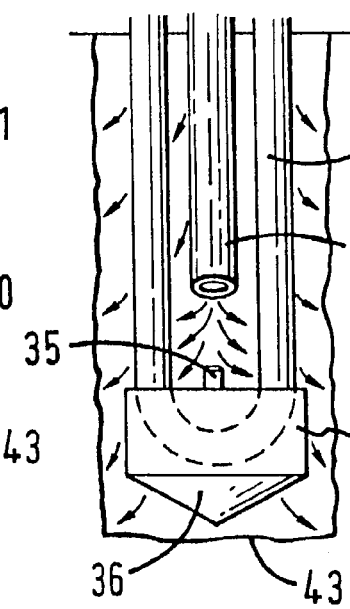
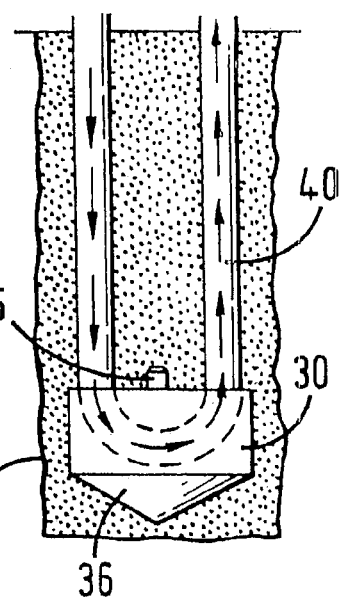
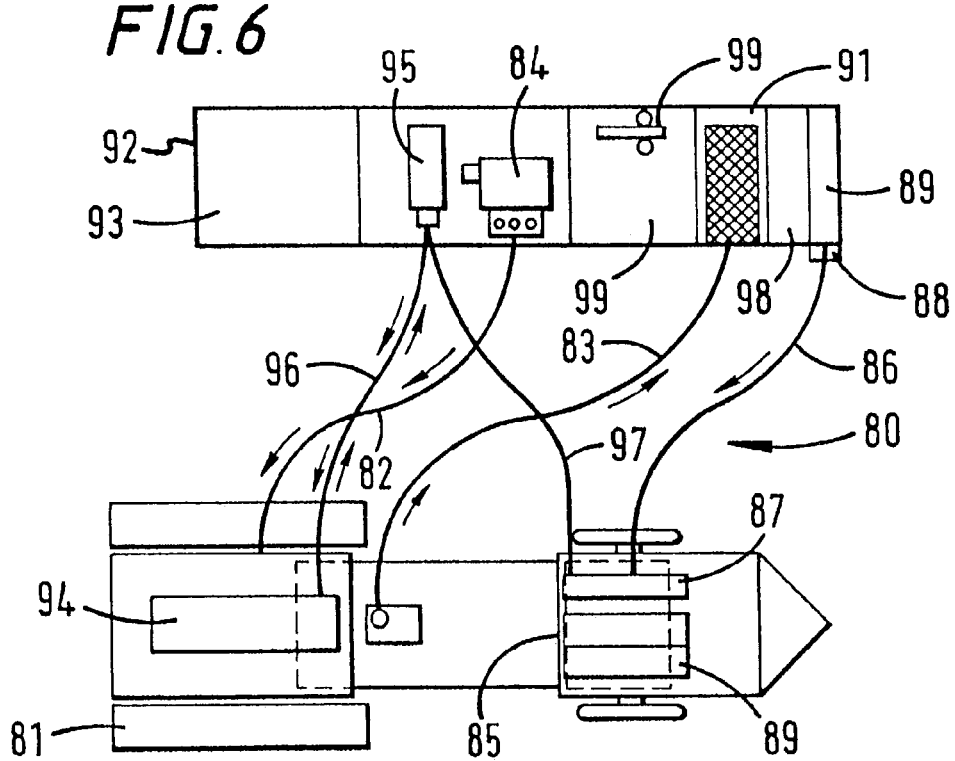

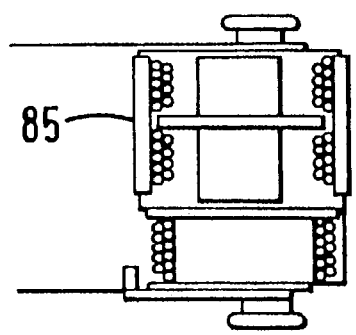
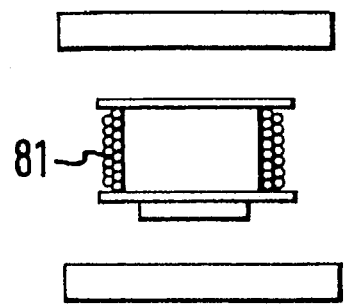
FIG.7A  FIG.7C
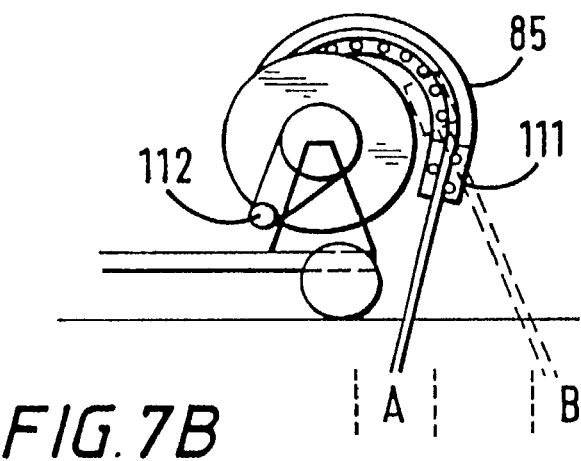
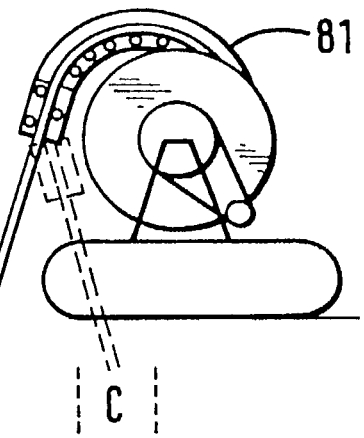
FIG.7B  FIG.7D
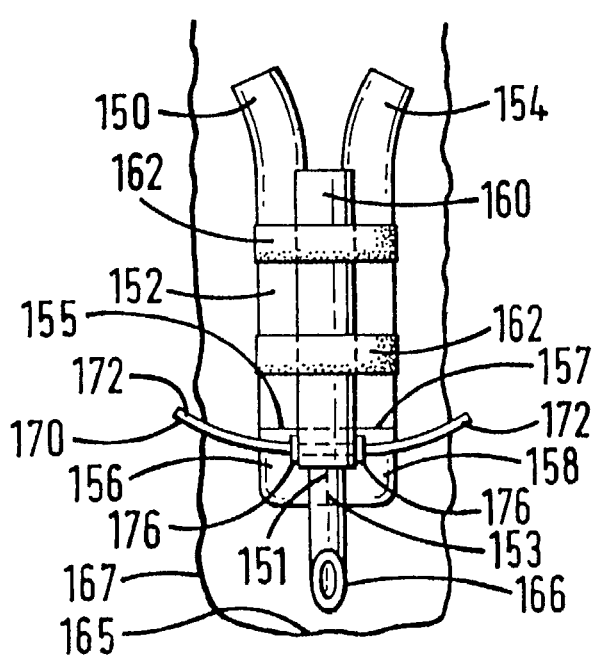
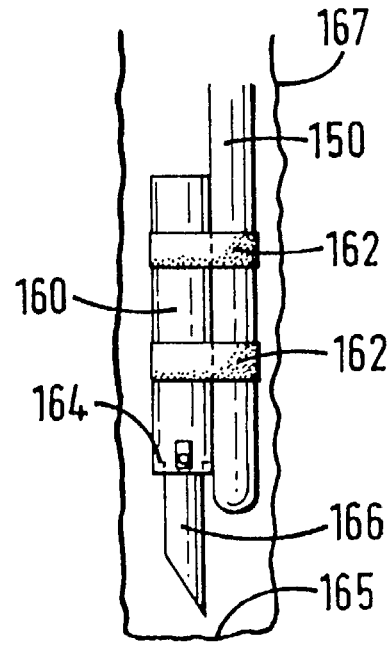
FIG.8A  FIG.8B

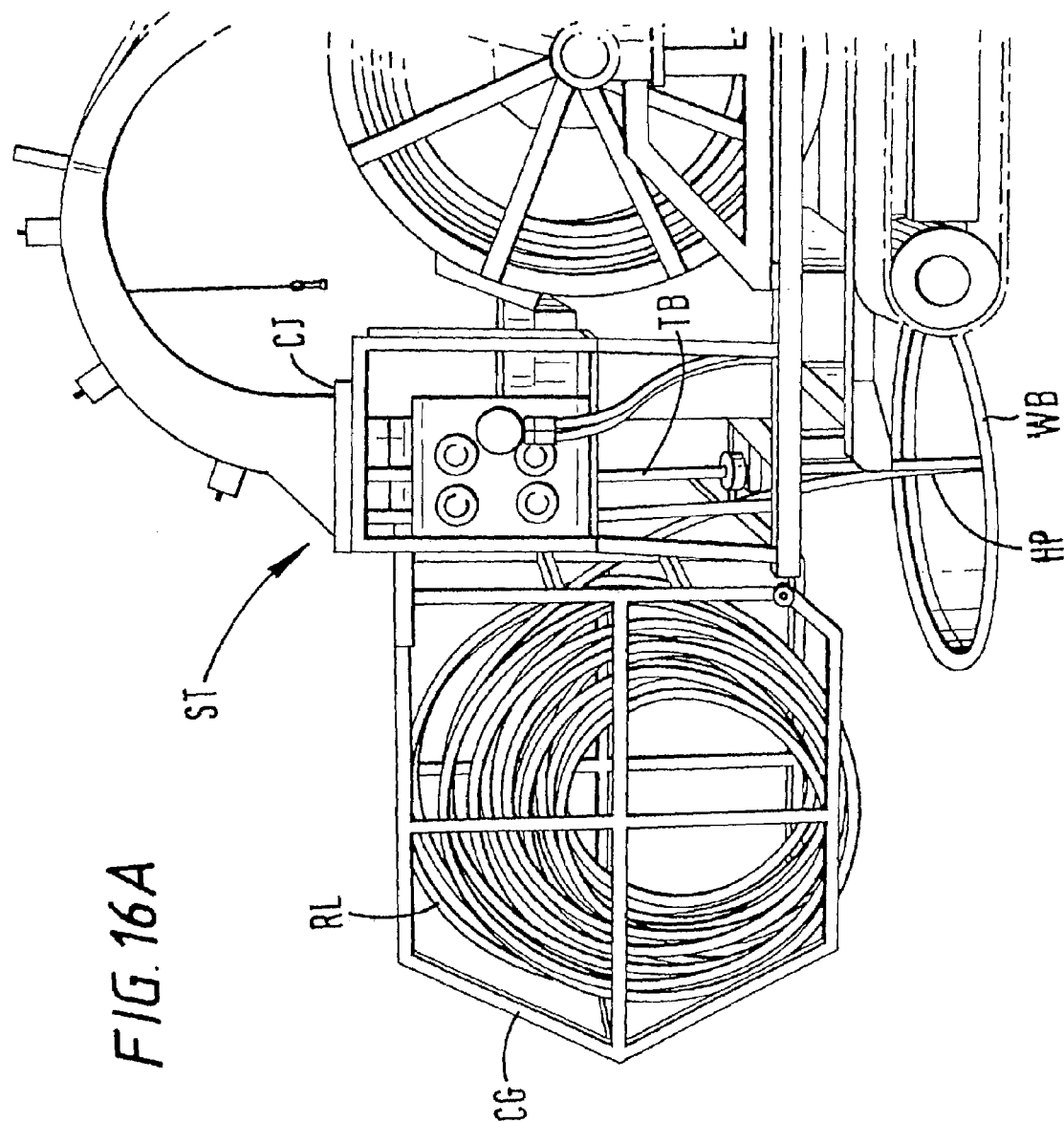

EARTH LOOP ENERGY SYSTEMS

RELATED APPLICATION

This is a continuation-in-part of U.S. application Ser. No. 09/930,385 filed Aug. 15, 2001, issued as U.S. Pat. No. 6,585,036B2 on Jul. 1, 2003 which is a continuation-in-part of U.S. application Ser. No. 09/459,416 filed Dec. 12, 1999 now U.S. Pat. No. 6,250,371 entitled "Energy Transfer Systems" which is a continuation-in-part of U.S. application Ser. No. 09/237,754 filed Jan. 26, 1999 now U.S. Pat. No. 6,672,371 entitled "Earth Heat Exchange System" which is a continuation-in-part of U.S. Ser. No. 09/087,705 filed Jun. 1, 1998 now U.S. Pat. No. 6,041,862 which is a continuation-in-part of U.S. application Ser. No. 08/779,812 filed Jan. 6, 1997 entitled "Underground Heat Exchange System" issued as U.S. Pat. No. 5,758,224, on Jun. 2, 1998 which is a division of U.S. application Ser. No. 08/527,114 filed Sep. 12, 1995 entitled "Underground Heat Exchange System" issued Jan. 7, 1997 as U.S. Pat. No. 5,590,715, all said patents and applications co-owned with the present invention and fully incorporated herein for all purposes.

BACKGROUND OF THE INVENTION

1. Field of the Invention

The present invention is directed to underground heat exchange systems; to apparatus and methods for installing a loop of pipe in a hole in the earth; and to thermally conductive filler materials for emplacement between the pipe loop and the interior hole wall.

2. Description of Related Art

The outstanding efficiency of closed loop ground source heat pumps is well known. In a typical system, for each unit of energy purchased from an electric utility to operate the system, 4 units of energy are extracted from or put into the earth in the form of heat. In order to exchange this heat with the earth, a closed loop pipe or series of closed loop pipes are buried in the ground. A heat exchange fluid is circulated through this buried pipe system. If a difference exists between the temperature of the fluid circulating in the pipe and the earth temperature, an exchange of heat occurs—primarily by conduction through the wall of the pipe. If the system is operating in the heating mode, heat is taken from the fluid inside of this circulating loop by a heat exchanger in the heat pump equipment. As this relatively cool water (35° F.) is circulated back through the relatively warm earth (65° F.), heat is transferred into the fluid, which is subsequently taken from this stream as it continues to circulate through the heat pump's heat exchanger. Similarly, if the system is operating in the cooling mode, the heat pump's heat exchanger puts heat into this circulating fluid. Then, as this relatively warm fluid (100° F.) is circulated through the relatively cool earth (65° F.), heat is given up to the earth and the relative cool fluid is circulated back to the heat pump to absorb more heat—and the process so continues. Because of its mass, the earth stays at a relatively constant temperature, providing a virtual limitless resource as a heat supplier and heat sink.

One reason ground source heat pumps have not been more widely used in the past is because of the expense involved in the design and installation of the circulating fluid pipe loop which must be buried in the ground. Many complex geological and installation parameters determine the rate of heat transfer between this buried heat exchanger and the earth and, subsequently, the operational performance and efficiency of the heat pump system. The uncertainty of the installation costs coupled with the uncertainty of the resulting operating efficiencies have made it difficult for a customer to predict the operating costs and the financial payback associated with installing a ground source heat pump system.

The present inventors have recognized that by having an independent company design, install, and own the ground heat exchange system or the ground loop, the uncertainty of installation costs and heat transfer is removed (from the customer's viewpoint). Now, the customer simply "buys" kWh of energy from the ground system provider. The present inventors have recognized that the ground system is an on-site power plant and that by the placement of an energy meter on the ground system, the precise amount of energy being transferred to and from the earth can be determined and sold to a customer in the form of kWh, exactly like the customer purchases power from the electric company. With such a new method and system, as recognized by the present inventors, the customer, by adding the cost of the power supplied by the electric company to the power supplied by the ground system owner, may accurately evaluate the cost and return on investment of the ground source heat pump system compared to alternative heating and cooling systems.

Several companies in the past have produced "energy meters" that calculate and record energy extracted from a circulating water loop and bill the customer for the energy used. This has been done for many years in "district heating" applications in Europe. Such equipment only records heat flow in one direction—usually heat extracted from the flow stream, not heat rejected into the flow stream as would be the case in a heat pump in a cooling mode (air conditioning operation).

The prior art discloses a wide variety of earth heat exchange systems and methods for using energy transferred by such systems.

The prior art discloses the use of a common grout, typically a bentonite clay mixture, for use as a thermally conductive material between a pipe loop of an underground heat exchange system and the interior of a hole in which the loop is positioned.

The cost for the installation of certain prior art vertical ground source heat loops can account for nearly half of the total cost incurred in the installation of a geothermal heat pump system. In certain aspects, the heat loop installation consists of drilling a vertical well, placing a thermoplastic pipe "loop" in the wellbore, and filling the annular space between the loop and the well wall with a thermally conductive material. Several problems can arise in such methods: loop "insertion" difficulties caused by loop buoyancy; thermal conductivity and installation difficulties of borehole backfill materials; and environmental concerns.

Although the drilling of the hole may be relatively easy, certain problems may be encountered in inserting the loop. In most applications, the "loop" consists of a relatively lightweight thermoplastic pipe. One material of choice is polyethylene, with a specific gravity of approximately 0.955 gms/cc$^3$ lighter than water. This pipe material also has relatively poor stiffness. As a driller attempts to push the pipe down into a mud filled well, the natural buoyancy of the pipe resists these efforts. Since the pipe has poor longitudinal stiffness, the pipe tends to bend or curl inside the well, creating additional frictional drag against the well wall until the pipe can be pushed no deeper. Even when the pipe is filled with water, the loop still maintains considerable buoyancy because the drilled hole is filled with dense drilling mud. In soft geological formations, the driller must mix heavy drilling mud in order to transport drilled cuttings and to stabilize the hole. In most cases, bentonite clay is added to the drill fluid to reduce friction, prevent loss of circulation, and suspend solids. However, the result is residual heavy drilling fluid in the well, creating a very dense slurry of clay, sand, rock, etc.—with resulting high buoyancy and low surface tension. In order to overcome the buoyancy problems, the driller usually attaches a heavy steel or other weight bar to the leading end of the heat loop and "pulls" the loop to the bottom of the well. Once the loop hits bottom, the driller 1) remotely secures the loop in the hole to prevent it from floating up, 2) remotely detaches the steel bar from the loop, 3) and recovers the bar from the well, usually by a cable winch. The considerable efforts made to overcome buoyancy of the loop caused by the density of the drill fluid are time consuming, expensive, and hazardous to the integrity of the loop.

The ability of the loop to transfer heat is directly related to the efficient operation of a geothermal heat pump system. Great expense and many tests and studies have been performed in a search for an optimum thermally conductive material that can be economically placed in the annular space between the loop pipe and the wellbore wall. An ideal material would be: at least as thermally conductive as the native earth; be easily and reliably placed in the borehole; maintain conductivity "long term", and be inexpensive.

In some applications, particularly those where a loop is installed below a water table, no "bore backfill" material is placed in the well. Over time, the water table may drop, leaving an insulating airspace between the loop and the borehole. This insulating airspace results in "hot loops", and the heat pump system either works poorly or not at all.

Many conductive high solids and cementitious "grouts" have been developed which include a mixture of water and a relatively conductive solid such as silica sand or fly ash. In order to transport the heavy solids, a viscosity enhancer such a bentonite clay is added. Also, friction reducers and "superplasticizers", like sulfonated naphthalene, are added to make the slurry pumpable. Although these grouts seem to work well in testing, there is great resistance from the field installers. The mixture can be expensive to handle, difficult to mix, even more difficult to pump, and extremely rough on equipment because of the abrasion. In addition, placing of the material in the borehole is difficult to control and monitor. If grouting is attempted from the surface, "bridging" can occur resulting in a partially filled hole. If grouting from the bottom of the hole, "channeling" can occur, again resulting in a partially grouted hole. When the water subsides in the borehole, this leaves air spaces, thus insulating the loop and reducing the efficiency of the system. An additional disadvantage is that the voids from channeling as well as the interstitial spacing between the individual sand (or other solid particles) create permeability. Permeability that creates a vertical communication path by which the ground water system could be contaminated by surface spills is an environmental concern.

The prior art cementitious grouts, developed to overcome the permeability objection, have some unique problems of their own. In addition to all of the handling, mixing, pumping, abrasion, and conductivity problems of the High Solids Thermally Conductive Grouts, the "heat of hydration" generated when cement cures, causes grout to "shrink" away from the polyethylene pipe. As heat is generated, the polyethylene pipe, having a very high coefficient of expansion expands. Once the cement cures and cools, the polyethylene contracts and actually pulls away from the grout. Although the permeability of the cured grout itself is very low, a flow path may now exist between the polyethylene pipe and the grout—again insulating the loop and threatening the environment. Because of its inherent structure, polyethylene is a very high molecular weight wax or paraffin, and does not bond well with anything, even under laboratory controlled conditions. Attempts to control grout shrinkage and cement to polyethylene bonding in the field were proven unsuccessful.

Drilling "polymers" have existed for years. They have been used in the oil well drilling industry as an alternative to bentonite clays to provide solids transport, solids suspension, friction reduction, and displacement efficiency.

The prior art discloses a variety of systems and apparatuses for installing ground heat exchange pipe loops in a wellbore, including a system in which a wellbore is drilled, e.g. a vertical hole four to four-and-a half inches in diameter to a depth of about 250 feet, and a single piece of polyethylene pipe attached to a sinker bar is introduced into the hole and then pulled out of the hole manually while grout is introduced into the hole. A pipe loop (polyethylene) is pushed to the bottom of the hole by a wire-line retrievable sinker bar. With the sinker bar removed, a series of screwed together 2 inch PVC tremmie pipes is lowered to the bottom of the hole and grout mixed at the surface is pumped into the tremmie pipe. As each batch is pumped into the hole the tremmie pipe string is raised and one 20 foot section of pipe is removed from the hole. After grouting is completed and the tremmie pipe is removed, the rig is moved to another drilling position, e.g. at least 15 feet away. When all of the pipe loops have been installed (e.g. one loop for each ton of heating and cooling equipment), the drill rig is removed from the site. A trench (e.g. about four feet deep) is then dug to contain pipes that interconnect all of the pipe loops and a connecting pipe is laid into the trench, heat fused to each of the vertical pipe loops, and pressure tested and buried to serve as a circulating manifold carrying water between the earth and a heat pump located within an adjacent building. The trenching and manifolding of the surface pipe typically takes as much time as the wellbore drilling and pipe installation.

The prior art discloses numerous in-ground heat exchanger systems (e.g. see U.S. Pat. Nos. 5,244,037; 5,261, 251); and grouting systems (see, e.g. U.S. Pat. No. 5,435, 387).

SUMMARY OF THE PRESENT INVENTION

This present invention, in at least certain embodiments, provides a method and apparatus for generating revenues by charging the consumer for energy provided by the earth during the operation of a ground heat exchange system which includes, but is not limited to, a ground loop systems as described herein, and, in one particular aspect, such a ground heat exchange system or ground loop system used with a heat pump. In certain embodiments of such a system the consumer is exchanging heat with the earth by circulating a heat transfer medium, e.g. but not limited to, water, through a ground heat exchange system or a continuous closed loop pipe system which is buried in the ground. As the heat transfer medium is pumped through the buried system, heat is exchanged between the heat transfer medium and the earth. When a heat exchanger apparatus or heat pump is operating in a heating mode, heat is taken from the earth and transferred into the heat transfer fluid, where it is again transferred to a primary heat exchanger component of the heat exchanger apparatus or heat pump equipment for the eventual heating of a structure or building. Having lost a portion of its BTU's from exchange with the heat exchanger apparatus or heat pump's heat exchanger, the relatively cooler heat transfer fluid continues to circulate back through the earth, where it again gathers heat from the relatively warmer earth. With the equipment operating in a cooling mode, this process operates in reverse—i.e., BTU's of heat are put into the heat exchange fluid and dissipated back into the relatively cooler earth. Thus, the structure or building is cooled. By measuring the total number of BTU's exchanged with the earth during both the heating and cooling modes of operating, the kWh-hrs of energy provided by the earth are precisely calculated and a customer is directly charged for the energy consumed.

In certain embodiments of this invention, an energy meter is placed between a heat exchanger and a heat exchange medium circulation system. The energy meter in one aspect has three components—a pair of temperature sensors (resistance thermometers), a flow sensor (e.g. a water meter), and a calculator unit (with recording and output interface features). Using a pair of temperature sensors (with electronic measurement circuit parameters built into an integration unit), the absolute temperature difference of the heat exchange fluid medium entering and exiting the earth is measured. A separate flow sensor (e.g. a water meter) continuously measures the flow volume. In the calculator element, the temperature difference is multiplied by the flow volume, and this result is processed in the calculator where the amount of energy is calculated. The outputted kWh readings are then used as the basis for billing the customer for the energy used. By measuring the absolute value of the temperature difference, the kWh can be calculated by using only one energy meter, regardless of whether the system is operating in the heating or the cooling mode. In other aspects, two separate meters are used, one for the heating mode, and one for the cooling mode.

The present invention, in certain aspects, discloses a method for providing energy to an end user from an energy transfer loop system and/or a method for extracting excess and/or waste heat from a facility, apparatus etc. In certain embodiments the method includes metering the amount of energy transferred from the loop system to the end user and/or metering the amount of excess heat extracted and invoicing the end user for the energy and/or for the heat extracted, e.g., but not limited to, at a charge per Btu or per kilowatt. In certain aspects an end user pays only for energy consumed and/or extracted and pays nothing for the loop system, and, in one aspect, the loop system is installed at an end user's site, property, or location. In other aspects, an end user pays some or all of the cost of loop system installation and/or maintenance.

In certain aspects the present invention discloses an energy transfer loop system which includes one or more methods for metering energy extracted from the earth with an energy transfer loop and/or energy introduced back into the earth with the system. Appropriate devices and apparatuses meter, quantify, calculate, record, totalize Btu's of heat exchanged, and/or transmit data ("metering etc.") regarding energy transfer by the system and use by the end user. Energy transfer systems according to the present invention may operate in a heating mode or in a cooling mode.

In certain aspects, systems for metering, etc. for energy transfer systems according to the present invention include one or more temperature sensors for sensing the temperature of an energy transfer fluid flowing in the energy transfer system; a fluid flow sensor for measuring (periodically or continuously) amount (flow volume) and/or rate of fluid flow in the energy transfer system; and/or a calculator device for calculating the amount of energy produced and/or the amount of energy delivered to and used by the end user and/or the amount of heat extracted and/or an amount to be invoiced—e.g., but not limited to a calculation including multiplying a temperature difference of fluid in versus fluid out by the flow volume or multiplying a temperature difference of fluid out versus fluid in by the flow volume. In one aspect a pair of temperature sensors with electronic measurement circuit parameters built into an integration unit measure absolute temperature difference between a heat exchange medium entering and exiting the earth. Based on the absolute value of the temperature difference, energy delivered (e.g. in kilowatt hours) (and/or heat extracted from a facility) can be calculated using only one energy meter in the system, whether the system is operating in a heating mode or a cooling mode.

In certain aspects systems according to the present invention use known metering systems provided by ABB Metering SVM AB Company of Sweden, e.g. The commercially available Model SVM 840 energy meter system which includes a pair of temperature sensors (resistance thermometers), a flow sensor (water meter), a calculator unit and, optionally, apparatus for power calculation, printing, and connection to a computer. In one aspect a commercially available SVMV431 flow sensor and SVM F2 or F3 calculator from ABB Metering is used. For the various quantifying, calculations, and recording functions of systems according to the present invention, any known suitable computer (appropriately programmed with known software) or electronic calculator may be used. In certain aspects, the invoice production function of systems according to the present invention are done by known computer systems programmed with appropriate software and capable of receiving input from the metering system regarding the basis for invoices. The transmission function of systems according to the present invention may be accomplished by any suitable known transmitter and/or transmitting system which transmits any and/or all system records and/or outputs, including, but not limited to recorded data and/or calculations. Transmission can be to an adjacent, nearby, and/or remote system and/or location.

The present invention discloses, in certain aspects, a wellbore heat loop system including a heat loop wellbore in the earth extending from an earth surface down into the earth to a bottom of the wellbore, a heat loop disposed in the heat loop wellbore and extending down to a position near the bottom thereof, the heat loop comprised of heat loop pipe, filler material around the heat loop in the wellbore, the filler material including a gel with an amount of water, and an amount of a gel material mixed with the water. In certain aspects the filler material has a thermal conductivity of at least 1.2 or at least 1.4 and includes gelling polymer, solids and water present, by weight, in the ranges of polymer—about 0.3% to about 5%, water—about 25% to about 50%, and solids—about 50% to about 80%.

The present invention also discloses, in certain embodiments, a bottom member for an earth bore heat loop system, the bottom member having a body, a first bore through the body extending from a first opening of the body to a second opening of the body, the first opening and the second opening each sized and configured for receipt therein of an end of heat loop pipe, a second bore having at least one opening on the body, the second bore sized and configured for securement thereat of an end of coil tubing; and at least one fluid exit port in fluid communication with the second bore for jetting fluid from the bottom member.

The present invention, in certain aspects, discloses a ground heat exchange system filler material which, in one aspect, includes a gel material and water; and, in another aspect, includes a gel material, water and thermally conductive material or solids (e.g. but not limited to sand; powdered metal, e.g. aluminum, zinc, aluminum alloys, zinc alloys, iron, steel; and/or crushed granite). In particular aspects, either the gel/water or gel/water/solids mixture also includes a biocide and/or a cross-linking agent when the gel material is a polymer.

In certain aspects the gel material is a polymer, e.g. but not limited to xanthan gum, guar gum or polyacrylamide polymers; and in certain particular embodiments the resulting filler material does not crack when it shrinks and/or is rehydrateable. In other aspects the polymer is a rehydrateable polymer. Suitable gel materials include, but are not limited to xanthan biopolymers; commercially available Xanvis L™ material from Kelco Oil Field Group; Kelzan L™ material from Kelco Oil Field Group; ASP 700 polymer from Exxon-Nalco Co.; known drilling fluid polymers that form a gel with water; and synthetic polymers with suitable gelling characteristics; including, but not limited to, polyacrylamide polymers.

Such filler materials mentioned above may be used in any invention described below using grout, either instead of the grout or in combination with grout; and any grouting pipe and method described below may employ such filler material instead of and/or in addition to grout.

The present invention, in one embodiment, discloses a system for simultaneously installing a heat exchange fluid pipe loop and a grouting pipe in a wellbore. The system, in one embodiment, has a bottom member to which both pipes are attached and to which the grouting pipe is releasably attached. The bottom member may be of sufficient mass itself or it may have weights connected thereto so it will easily move down the wellbore. In another embodiment an integral loop of pipe is used with an inlet pipe secured to one side of the loop and an outlet pipe secured to the other side of the loop.

In one aspect the bottom member has an inlet connection and an outlet connection to which are secured inlet and outlet pipe of the pipe loop. A passageway through the bottom member provides for fluid communication between the inlet and outlet pipes so that heat exchange fluid may flow down the inlet pipe, through the passageway in the bottom member, and up through the outlet pipe.

In one aspect such a bottom member has a hole in which the grouting pipe is held. Pulling on the grouting pipe releases it from the bottom member for removal from the wellbore as grout flows out from the bottom of the grouting pipe.

In certain embodiments the grouting pipe is made of commercially available coiled tubing, e.g. in one aspect with an inside diameter of about one and three-tenths inches and an outside diameter of about one and a half inches; and the pipe loop is, e.g., three quarters of an inch in inside diameter made of high density polyethylene. In certain embodiments a wellbore for such heat exchange systems is three to three-and-a-half inches in diameter. In one aspect the bottom member is made of plastic and is pointed to facilitate its downward movement in the wellbore.

In one system and method according to the present invention a coiled tubing unit (CTU) is used to drill heat loop bore holes. The CTU has a reel on which is wrapped continuous flexible steel tubing, an injector which transports the tubing into and out of the hole, a drill bit on the end of a down hole motor, and a pump which supplies fluid for drilling. The motor is rotated by the pump pressure from the surface, which allows the unit to drill without rotating the drill string. This feature results in several benefits not possible with conventional drilling rigs. Directional drilling allows multiple wells to be drilled from one location. It also reduces the space required between bore holes and allows them to be drilled in a very close proximity to the subject building. This process not only reduces 80 percent of trenching on some jobs, but allows the unit to drill under existing slabs, driveways, parking lots and buildings. The compact design and directional drilling capabilities opens the retrofit market to geothermal systems.

With a method according to the present invention a relatively short surface trench is excavated before drilling is started. The drilling machine straddles the trench, drilling bore holes in the bottom of the trench as it moves over the length of the trench. A solids control system which cleans the drilling fluid as it is pumped from the hole, allowing cuttings to be dry discharged in a designated area, thereby maintaining a clean, dry drill site. As each hole is drilled, a track mounted rig moves approximately two to three feet down the trench to the next drilling location. A grout reel is then positioned over the previously drilled hole. This reel has a flexible grout pipe wrapped around a powered reel. As the grout pipe is pushed down the bore hole, it takes a plastic heat loop with it to the bottom of the hole. In certain preferred embodiments the loop is secured in the hole with an anchor apparatus; then the grout pipe is retracted while filling the hole with grout. Since a sinker bar is not required in this process, a 3 to 3¼ inch diameter hole is drilled, in certain embodiments, compared to a conventional 4 to 4½ inch hole. This results in faster penetration, improved fuel efficiency, and improved heat transfer to the earth.

After installation of heat loops in multiple adjacent holes, the loops are heat fused into a common manifold. A return line to a facility or building is attached to the manifold and purged of all remaining air. The system is then pressure tested before being attached to a heat pump.

This invention provides these benefits: shorter surface trench and dry discharge results in less site damage; smaller bore hole increases system efficiency by improved heat transfer; total system installation time is reduced by at least 50 percent as compared to some prior art methods; and usable space is increased by drilling under slabs and other surface structures.

The U.S. Department of Energy states in a recent report that a system with these capabilities is needed to meet its goal of 400,000 installations by the year 2000.

In certain embodiments, the present invention discloses a system with coil tubing and a grout pipe with a curved member or members or a solid or hollow ball or partial ball at the end of the pipes to facilitate movement of the system through a wellbore and to prevent the lower end of the system from hanging up on or being caught by a ledge or uneven portion of the wellbore.

What follows are some of, but not all, the objects of this invention. In addition to the specific objects stated below for at least certain preferred embodiments of the invention, other objects and purposes will be readily apparent to one of skill in this art who has the benefit of this invention's teachings and disclosures. It is, therefore, an object of at least certain preferred embodiments of the present invention to provide:

New, useful, unique, efficient, nonobvious methods for providing energy to an end user from a ground energy transfer system and, in one aspect, from an energy transfer loop system;

Such method that include metering and quantifying energy delivery and the calculation, recordation, and/or transmission (to a nearby or remote location) of data related thereto;

Such methods that include the transmission of data regarding the measurement of energy and delivery of energy to an end user;

Such methods including invoicing an end user for energy delivered to it; and

Such methods which determine an absolute value of energy transferred;

New, useful, unique, efficient, nonobvious devices and methods for systems and methods for installing heat exchange pipe loops in wellbores; filler materials for emplacement around such loops and methods employing such materials; for grouting and/or adding filler material to such wellbores; and for drilling such wellbores;

Such systems using a filler material that includes a thermally conductive material in suspension with a gel material such as a suitable polymer and, in one aspect, with a cross-linking agent to assist in maintaining solids of the thermally conductive material in suspension with the polymer;

Such systems including a bottom member to which a pipe loop and a filler or grouting pipe are secured, the bottom member for releasably holding the pipe, the bottom member for facilitating entry of the pipes into the wellbore, and, in one aspect, a curved member or members at the end of the pipes and tubing to facilitate movement of the system through a wellbore;

Such systems with a bottom member having a bore for receiving two pieces of a heat loop and coil tubing (or a connector for connecting coil tubing to the bottom member and, in one aspect, such a bottom member with a hole therethrough for pumping material through the coil tubing and out from the bottom member; and Heat exchange systems with a plurality of heat exchange pipe loops drilled relatively close to each other with simultaneous filling and/or grouting of one wellbore while another wellbore is being drilled.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 3 is a schematic view of an underground pipe loop heat exchange system according to the present invention.

FIG. 4A is a top view of a bottom member according to the present invention; FIG. 4B is a side view of the bottom member of FIG. 4A.

FIGS. 5A–5C are side schematic views of a system according to the present invention.

FIG. 6 is a top schematic view of a system according to the present invention.

FIG. 7A is a top schematic view of the grouting unit of the system of FIG. 6. FIG. 7B is a side view of the grouting unit of FIG. 7A. FIG. 7C is a top view of the drilling unit of the system of FIG. 6. FIG. 7D is a side view of the drilling unit of FIG. 7C.

FIG. 8A is a front view of a pipe heat exchange loop and related items according to the present invention. FIG. 8B is a side view of the items of FIG. 8A.

FIG. 16A is a side view of a heat loop installation system according to the present invention.

DESCRIPTION OF EMBODIMENTS PREFERRED AT THE TIME OF FILING FOR THIS PATENT

Figures 1, 2:
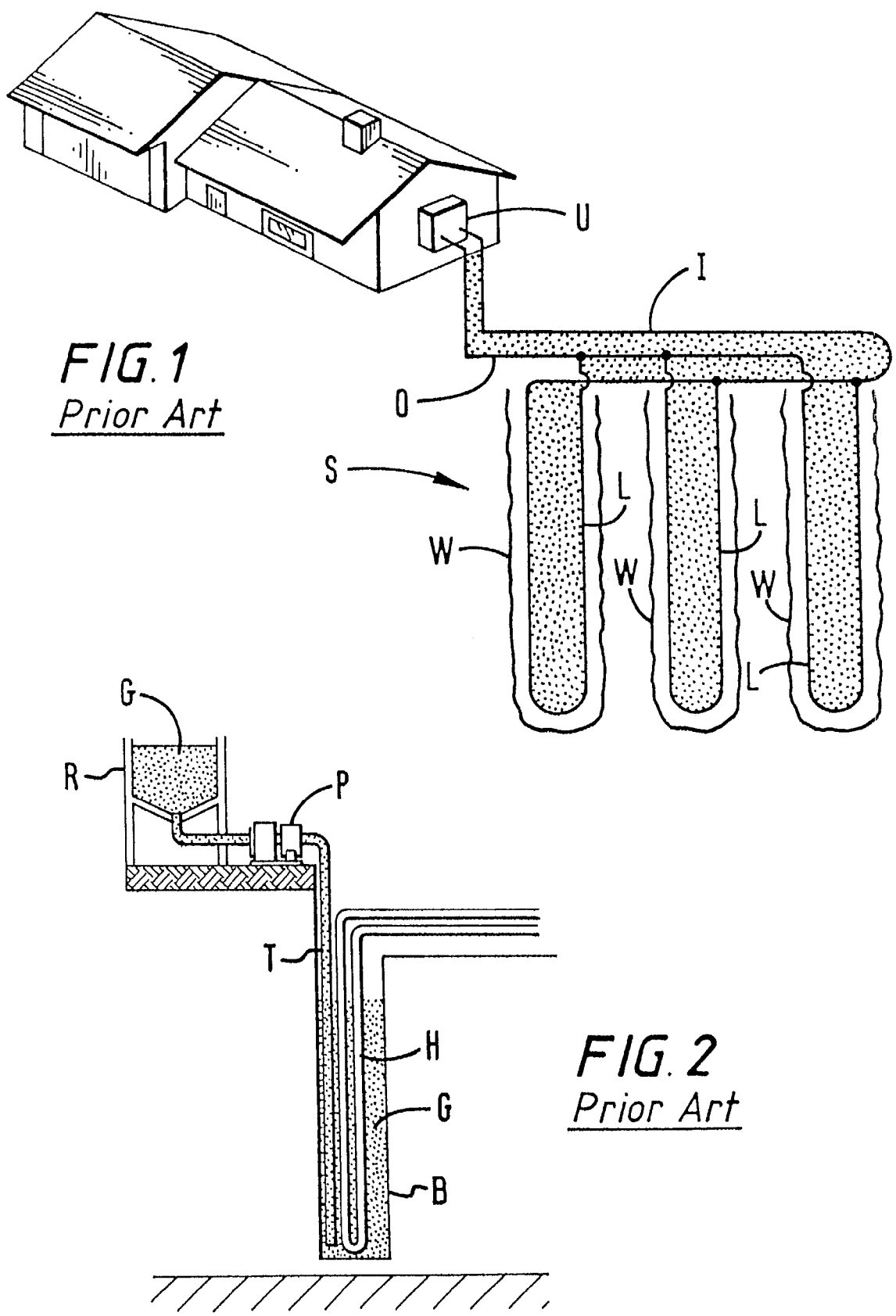
FIG. 1 is a schematic view of a prior art underground pipe loop heat exchange system.
FIG. 2 is a schematic view of a prior art wellbore grouting system.

Referring now to FIG. 1, a prior art underground heat exchange pipe loop system S has a plurality of wellbores W, each e.g. about 250 feet deep and 4 to 4.5 inches in diameter, which are preferably, between about ten feet to fifteen feet apart. Water flows from a building's processing unit U in an inlet pipe I into each inlet side of a plurality of pipe heat exchange loops L and then flows up in each outlet side of the loops L to an outlet pipe O which is in fluid communication with the processing unit U. Pipes I and O are typically about 45 feet long for a three loop system as shown (preferably about ten to fifteen feet between each loop).

FIG. 2 illustrates a prior art system and method for grouting a wellbore such as the wellbores W in FIG. 1. After a pipe heat exchange loop H is installed in a wellbore B, a grout pipe T is inserted into the wellbore B. A grout pump P then pumps grout G from a reservoir R down the grout pipe T from which it flows into the wellbore B.

FIG. 3 shows a system 10 according to the present invention which has a plurality of wellbores 12; a water inlet pipe 14; and a water outlet pipe 16. The system includes a processing unit (not shown, like the unit U, FIG. 1), e.g. with pump(s), controller(s), a heat exchanger, and a compressor. The processing unit makes heated air or cooled air available to an adjacent facility or building such as a residential home 19. A manifold 13 interconnects heat loops 11 in the wellbores 12.

In one embodiment the wellbores 12 are about two to three feet apart at the surface. The length of the pipes 14 and 16 depend on the distance of the facility from the wellbores. Both the system S (FIG. 1) and the system 10 (FIG. 3) provide about 3 tons of air conditioning. Typically a 250 foot wellbore is required for each ton of operating capacity. One three ton unit according to this invention has three 250 foot wellbores each with a 500 foot (250 feet down, 250 feet up) heat loop.

FIGS. 4A and 4B illustrate a bottom member 30 according to the present invention which includes two similar halves 31 and 32 which are secured together with bolts 33 to hold a loop of pipe 34. A rod 35 projecting upwardly from the bottom member 30 is sized to receive and hold a filler or grout pipe slipped loosely over the rod 35. In one aspect the grout pipe is filled with filler material or grout as the device is moved down into a wellbore. An end 36 of the bottom member 30 is pointed to facilitate its entry into and movement through the wellbore. In one aspect drilling fluid is circulating down through the pipe to facilitate lowering of the entire assembly to the bottom of a hole. In one aspect the pipe 41 fits around the rod 35 with a loose fit, allowing drilling fluid to be circulated down through the pipe 41, around the rod 35, and out into the wellbore.

FIGS. 5A–5C illustrate one system and method according to the present invention. A bottom member 30 with a pipe loop 40 (heat loop) secured therein and a filler or grouting pipe 41 releasably secured thereto is moved down into a wellbore 43 (FIG. 5A). Once the bottom member 30 reaches the bottom of the wellbore 43, the pipe 41 is pulled off the rod 35 and grout is pumped down the pipe 41 and into the wellbore 43, surrounding the pipe loop 40 and the bottom member 30 (FIG. 5B). The pipe 41 is removed from the wellbore 43 and the pipe loop 40 is filled and/or grouted in place (FIG. 5C).

In one aspect the pipe 41 is filled with drilling fluid as it is moved to the bottom of a wellbore. Once the pipe 41 is released from the bottom member 30, the drilling fluid in the pipe 41 is displaced out from the pipe 41 and up into the annulus between the heat loop and the wellbore's interior as filler and/or grout is pumped down into the pipe 41. When an amount of filler and/or grout sufficient to encapsulate the pipe heat exchange loop in the wellbore (either entirely or portion(s) thereof) has been pumped into the wellbore and/or pipe, then drilling fluid is again pumped down into the pipe 41 to push all filler and/or grout out from the pipe 41 so it does not set up in the pipe 41.

FIGS. 7A–7D illustrate the unit 85 and the drilling unit 81 of the system 80 (FIG. 6). As shown in FIGS. 7B and 7D, after the drilling unit 81 has drilled a wellbore A, a filler and/or grouting assembly according to the present invention is introduced into the wellbore A by a drive 111 of the unit 85. Simultaneously the drilling unit 81 is moved to drill wellbore B (shown in dotted lines, FIG. 7B). Upon the completion of the drilling of wellbore B a drive 112 removes the filler and/or grouting assembly from the wellbore A and then upon completion of the filling and/or grouting of wellbore A, the drilling unit 81 is pivoted to begin drilling wellbore C (shown in dotted lines, FIG. 7D) while the unit 85 is pivoted to begin to fill and/or grout wellbore B.

FIG. 6 illustrates a drilling-filling system 80 according to the present invention. A drilling unit 81 has flow lines 82 and 83 through which a triplex pump 84 on a trailer 92 pumps motive drilling fluid to energize a downhole drilling motor (not shown) on coil tubing 94 of the drilling unit 81. A unit 85 has a flow line 86 through which a Moyneaux (or progressive cavity) pump 88 pumps grout from a reservoir 89 into a wellbore (not shown) beneath the drilling unit 81. A shale shaker 91 is used to clean the drilling fluid used by the drilling unit 81. Drilling and tube units transport space 93 is provided for storing and transporting equipment. An hydraulic power unit 95 provides power for the drilling unit 81 via line 96 and for the unit 85 via a line 97. A mud mixing tank 98 is in communication with an active mud system and is used when new drilling fluid is blended. A desilter 99 is provided for removing very fine solids from the drilling fluid. The unit 85 includes a pipe reel 87 and a heat loop reel 89.

FIGS. 8A and 8B show one embodiment of a system 150 according to the present invention. A first hollow elbow 156 made from polyethylene with a wall thickness of about 0.113 inches has a side opening 151 which is fused to a side opening 153 of a second hollow elbow 158. A first polyethylene pipe 152 is fused to a top opening 155 of the first elbow 156 and a second polyethylene pipe 154 (e.g. three quarters of an inch in inside diameter, 1.1 inches in outside diameter) is fused to a top opening 157 of the second elbow 158. Heat exchange fluid, e.g. but not limited to water, is flowable down through the first pipe 152, through the first elbow 156, through the second elbow 158, and then up through the second pipe 154, or vice versa. Pieces of tape 162 secure a piece of pipe 160 (made, e.g., of PVC). A filling and/or grouting pipe (not shown) is inserted down into the pipe 160 so that it abuts a top shoulder 164 of a pointed pipe 166 secured in the pipe 160. The pipe 166 is pushed down a wellbore 167. As the system 150 is inserted into the wellbore 167, a bendable anchor 170 with one or more arms 172 moves into the wellbore with the system 150. On one aspect the anchor is. made of plastic. In one aspect such an anchor 170 has two arms 172 and is a single piece of plastic tubing or rod half an inch thick which extends through holes 174 in the pipe 160. Lock washers 176 facilitate securement of the anchor 170 in place. An upward pull on the system 150 spreads the arms 172 and forces them into the earth around the wellbore 167, thereby anchoring the system 150.

Figure 9A:
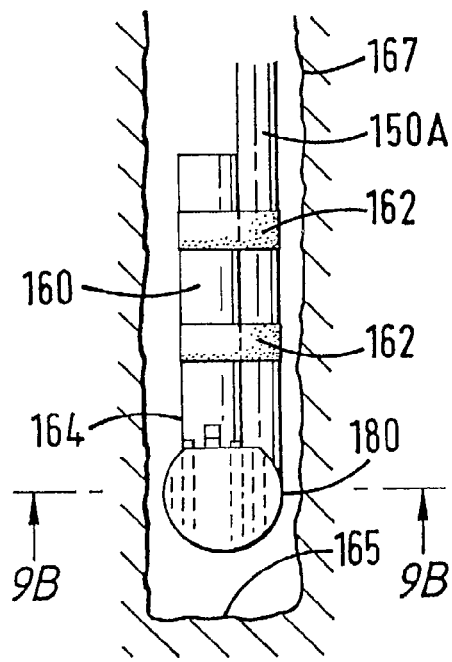
FIG. 9A is a front view of a pipe heat exchange loop and related items according to the present invention.
Figure 9B:
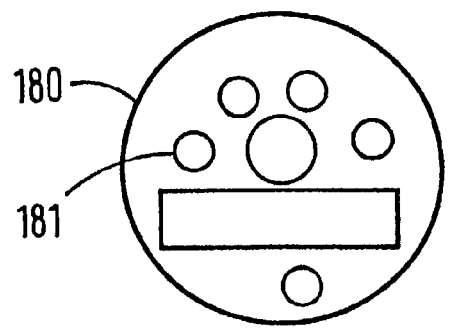
FIG. 9B is a cross-section side view along line 9B-9B of FIG. 9A.

FIG. 9A shows a system 150a like the system 150 of FIG. 8B and like numerals indicate the same parts. A ball 180 which is generally spherical in shape with a flat top is secured at the ends of the pipe 166a (like the pipe 166). Optionally, the ball 180 has a series of flow channels 181 therethrough. The ball 180 facilitates passage of the system 150a through a wellbore and inhibits catching of the system on a ledge or indentation in the wellbore. It is within the scope of this invention to use any curved member or members, hollow ball, curved nose, bowl, half-bowl, or tapered member instead of the ball 180 to facilitate the movement of the system 150a through a wellbore. A filling and/or grouting pipe (e.g. coil tubing) is insertable into the pipe 160 as with the system of FIG. 8A.

Figure 10:
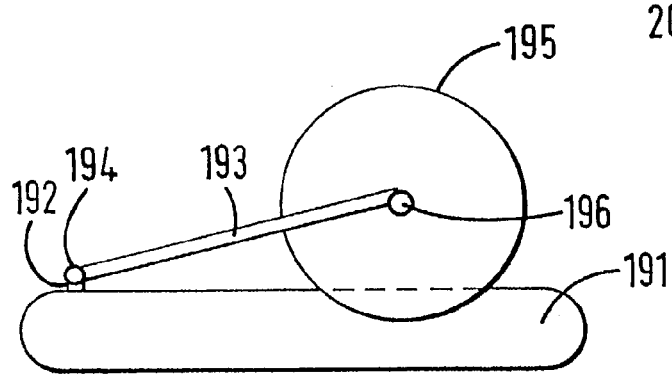
FIG. 10 is a schematic side view of a system according to the present invention.

FIG. 10 shows a coil tubing system 190 with a base 191 having a support 192 secured thereto. A beam 193 is pivotably mounted with a pivot member 194 to the support 192. A shaft 196 of a coil tubing reel 195 is rotatably mounted to the beam 193. The reel 195 can be raised and lowered with respect to the base 191.

Figure 11:
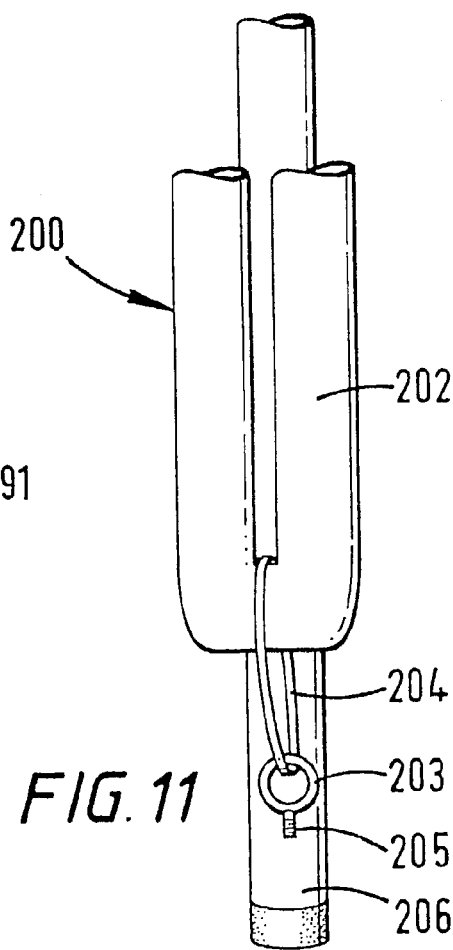
FIG. 11 is a front view of a system according to the present invention.

FIG. 11 shows a system 200 according to the present invention with a heat exchange loop 202 like any described herein which is attached to a connector 203 by a loop or ring 204. The connector 203 is secured to a coil tubing 206, e.g. with epoxy and/or any suitable fastener, such as, but not limited to, a screw 205. The coil tubing 206 and the loop 202 (although shown partially) may be of sufficient length to extend from the bottom of a wellbore to the earth's surface.

Figure 12:
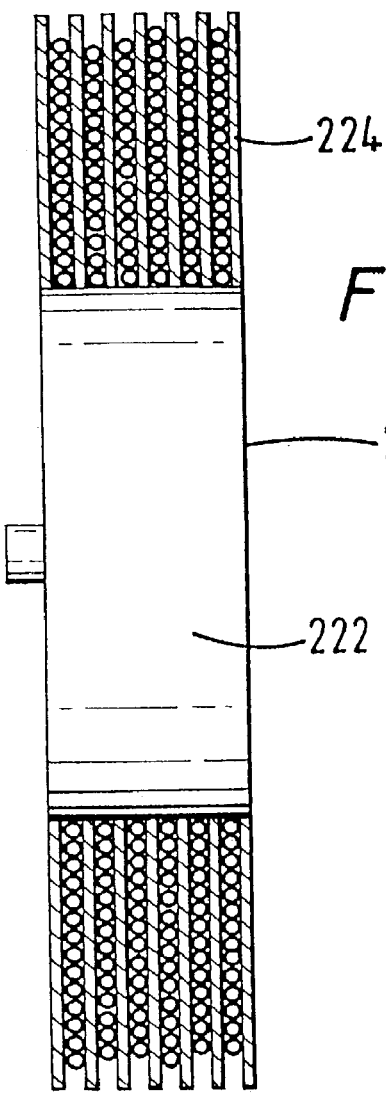
FIG. 12 is a side cross-section view of a system according to the present invention.

FIG. 12 shows a coil tubing reel 220 according to the present invention which has a main generally-cylindrical body 222 and a plurality of fingers 224 between which are disposed individual discrete lengths of coil tubing. When drilling multiple holes with the same coil tubing, the coil tubing may become worn or damaged. When this occurs using the reel 220 with any system disclosed herein, the worn length of tubing is simply disconnected from the drilling apparatus and another length between two other fingers is used. All the coil tubing on the reel may be of the same diameter. Alternatively, coil tubing of different diameters may be used between different pairs of fingers.

Figure 13:
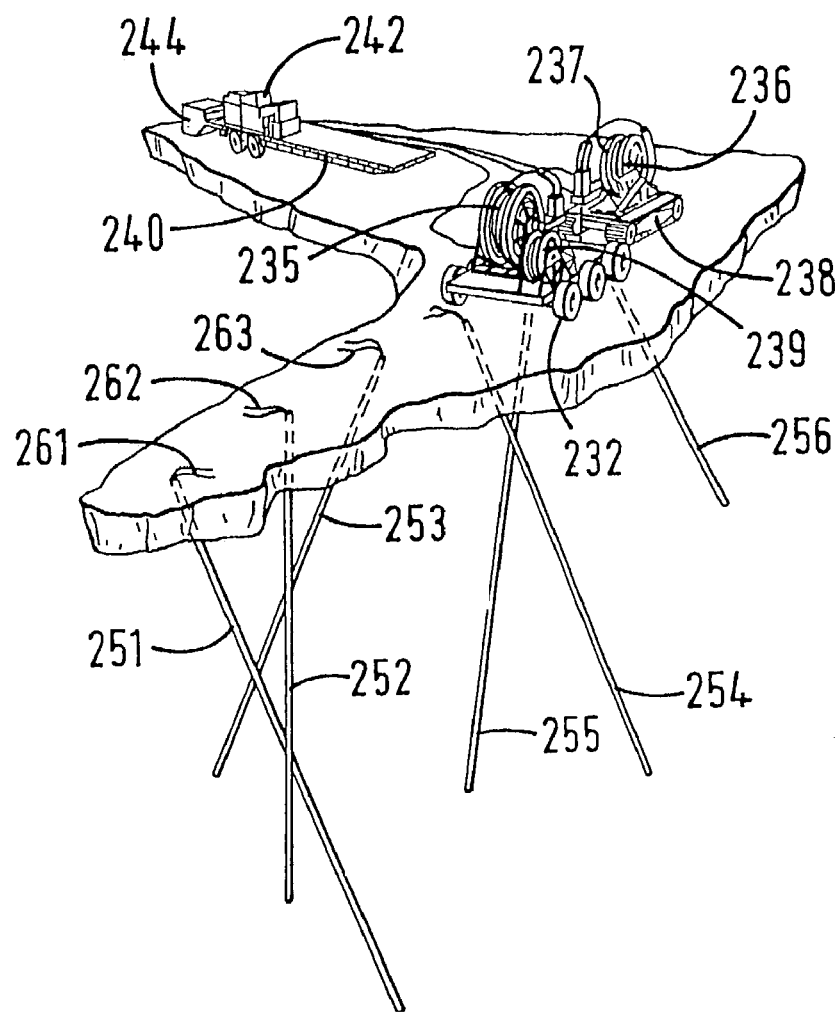
FIG. 13 is a perspective view of a system according to the present invention

FIG. 13 shows a system 230 according to the present invention with a trailer-mounted reel 232 containing coil tubing 235 to which is attached a heat loop pipe 234 from a reel 239. The reel 239 may be on the trailer 232 or on the ground or a skid adjacent a borehole 255 into which the coiled tubing 235 is pushing the heat loop 234. A coil tubing reel 236 on a self-propelled base 238 has coiled tubing 237 thereon. A drilling apparatus, not shown, is at the end of the coil tubing 237 within a wellbore 256 being drilled in the earth. A trailer 240 (or a truck may be used) supports the associated apparatus 242 (like that in FIG. 6) and a cuttings bin 244 receives cuttings produced by the drilling. The system shown in FIG. 13 has completed a series of boreholes 251, 252, 253, and 254 (e.g., in one aspect, as previously described herein), each with a corresponding heat loop 261, 262, 263, 264 grouted in place therein with a portion extending out from the top of each borehole.

In an alternative step or steps for any method disclosed herein, instead of removing a filler and/or grout pipe, tubular or tube from a borehole as the filler and/or grout is pumped into the borehole, some or all of the pipe, etc. may be left in the borehole permanently. In such a case, one or more holes or openings may be made near the end of the pipe (or at any other desired location in the pipe, including, but not limited to, a series of spaced apart hole along the length of the pipe) to facilitate pumping of filler and/or grout into the borehole.

In one aspect filler material according to the present invention uses polymers designed to molecularly bond with water. This molecular bonding has the practical effect of increasing the viscosity of the fluid, enabling the fluid to carry heavy particles and also prevent lost of circulation. Thus the filler material is a molecularly bonded gel. Bentonite and other drilling clay additives perform the same function, but by creating a colloidal suspension, not a molecularly bonded gel. Consequently, the bentonite may eventually settle out and separate from the water and the water may eventually be lost from the borehole. However, in one aspect the molecular bond between the polymer, e.g., but not limited to, xanthan gum, and the water molecule can remain indefinitely. In one aspect the polymer is chemically stabilized with a biocide.

In certain embodiments in very high concentrations, a xanthan gum/water mixture consists of at least 97% water, and the thermal conductivity is substantially the value of water. It is also nonpermeable.

As far as installation considerations are concerned, a gelled filler material according to the present invention is pumpable with less friction than pure water. Having no abrasives, there is little or no wear and tear on pumping equipment, and the material's density is very nearly that of pure water. This low specific gravity, along with high surface tension and viscosity reduces or eliminates the buoyancy of a heat loop.

A filler material according to the present invention is, in one aspect, an aqueous stabilized 3% solution of xanthan gum which is less expensive to make than many thermally conductive grouts or cementitious grouts. Pouring three quarts of xanthan biopolymer in a barrel (42 gallons) of water makes a 3% solution.

In certain embodiments the present invention discloses a pumpable thermally conductive filler material for emplacement in a borehole around a heat loop that extends from a point below the earth surface up to the earth surface. Any of the methods for heat loop installation disclosed herein may be used to install such a heat loop and any such method that also includes grouting (and associated apparatus) may be used with the filler material used instead of the previously-described grouts and/or filler material with grout.

In one aspect the filler material is a gel including a polymer (e.g. a biopolymer and/or a synthetic polymer) and water. The amounts of water and polymer are in these ranges, by weight:

| Polymer | between about 0.5% and about 5.0% |
|---------|-----------------------------------|
| Water   | between about 99.5% and about 0.5% |

In certain particular aspects with respect to the fluid in the mixture, the polymer is present as about 1% by weight and the water is present as about 99% by weight; 2% polymer, 98% water; or 3% polymer, 97% water. In other typical embodiments, the polymer ranges between about 0.5% to about 3.0% of the total fluid weight and in one particular aspect is about 1.0% of the total fluid weight, e.g. one pound of polymer as provided commercially to about one hundred pounds of water. Thermally conductive solids may be added to any such mixture. In another particular aspect the polymer is a synthetic polyacrylamide polymer such as commercially available liquid ASP 700 from Exxon-Nalco. The polymer and water are mixed in a container and stirred together.

In other aspects, the filler material includes thermally conductive solids, e.g., but not limited, particles of sand, ranging in size between 30 mesh and 200 mesh. In certain preferred embodiments these ingredients are present, by weight, in the following ranges:

| | |
|---|---|
| Polymer | about 0.3% to about 5% |
| Water | about 25% to about 50% |
| Solids | about 50% to about 80% |

In one particular embodiment the polymer is present as about 1% by weight; the water as about 29% by weight and the sand as about 70% by weight. In another embodiment the polymer is present as about 0.4% by weight; the water as about 44% by weight; and the solids (sand) as about 55% by weight. The mixture is prepared, in one aspect, by pouring the ingredients into a container and mixing them together e.g. by stirring and/or with a paddle mixer.

Certain embodiments of any of the new filler materials described above or herein may also contain a polymer cross-linking agent, e.g. any suitable commercially available cross-linking agent to cross-link the polymer molecules to enhance water holding ability. In one aspect commercially available 0.2% VX6338 from Exxon-Nalco is used. In certain preferred embodiments, sufficient cross-linking agent its used to completely cross-link the polymer present. In certain preferred embodiments, rehydrateable polymers such as, but not limited to, polyacrylamide polymers are used. Such polymers may not crack upon dehydration, but may shrink. It is within the scope of this invention to introduce an effective amount of water into a borehole with the filler material therein to inhibit and reduce shrinkage and, in other aspects, to introduce water on a regular basis into such a borehole to accomplish this.

Using a filler material according to the present invention produces, in certain aspects, an underground heat exchange system—e.g. any as described herein—with filler material having a thermal conductivity at or above 1.2 and in certain aspects at or above 1.4 or 1.5. With certain preferred embodiments with a filler material having a thermal conductivity of about 1.4 (or greater) an effective heat loop according to the present invention may range between 140 and 400 feet in length (in a wellbore of corresponding depth), depending on the ground temperature, its thermal conductivity, and the wellbore diameter.

FIGS. 14A–14K show a bottom member 300 according to the present invention that has a body 302 with a heat loop bore 304. Dual heat loop pipe openings 306 are each configured and sized for holding an end of a pipe that forms one side of a heat loop. The heat transfer fluid flows down the pipe of one side of the heat loop, into the bore 304, and then up the pipe of the other side of the heat loop. "Heat Loop" means a heat exchange loop used, e.g. for cooling in the summer and/or heating in the winter.

A coil tubing bore 308 in the body 302 is configured and sized for receiving and holding an end of a string of coil tubing or for receiving and holding an end of a connector (e.g. see FIG. 14K) used to connect coil tubing to the bottom member 300. An end or ledge 309 serves as a stop member against which the lower end of the coil tubing (or of a coil tubing connector) rests.

Figure 14A:
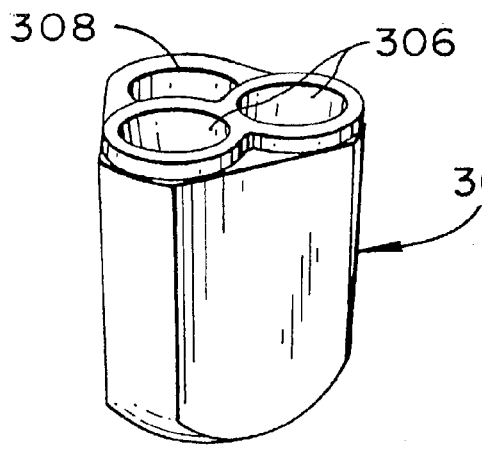
FIG. 14A is a perspective view of a heat loop bottom member according to the present invention.
Figure 14B:
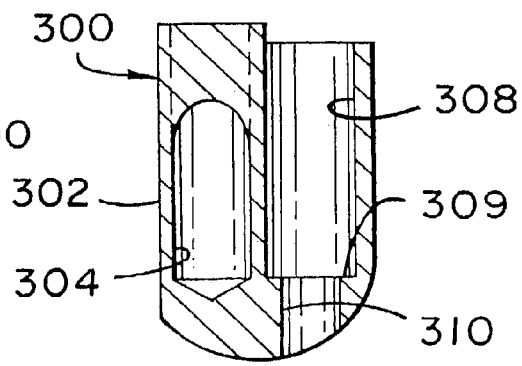
FIG. 14B is a side cross-section view.
Figure 14C:
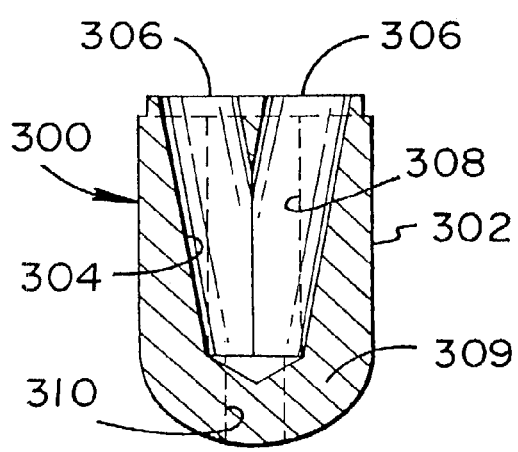
FIG. 14C is a front cross-section view.
Figure 14D:
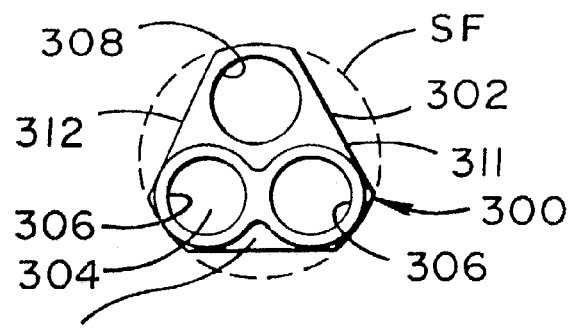
FIG. 14D is a top cross-section view of the bottom member of FIG. 14A.
Figure 14L:
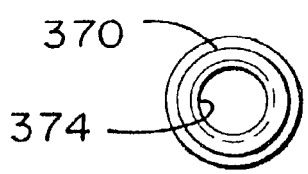
FIG. 14L is a perspective view of the coil tubing connector of FIG. 14K.
Figure 14M:
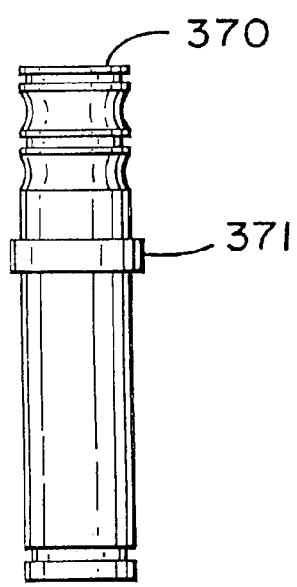
FIG. 14M is an end view of the connector of FIG. 14L.
Figure 14E:
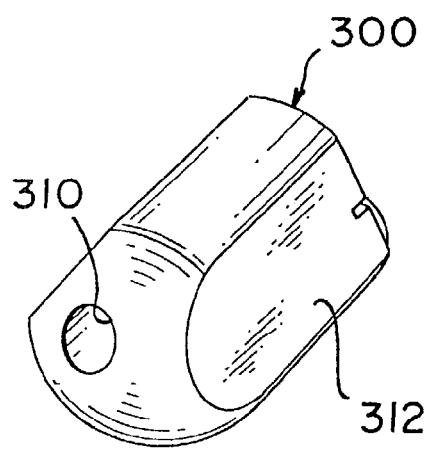
FIG. 14E is a perspective end view of the bottom member of FIG. 14A.
Figure 14F:
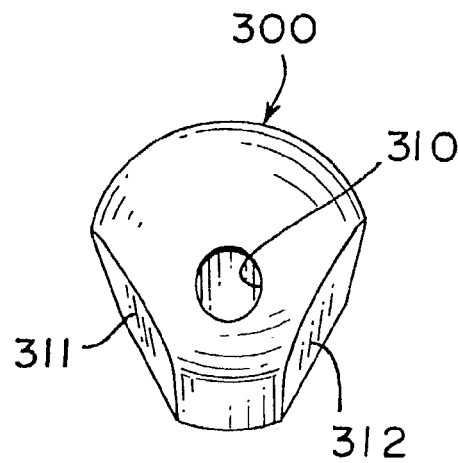
FIGS. 14F and 14G is a perspective top view of the bottom member of FIG. 14A.
Figure 14G:
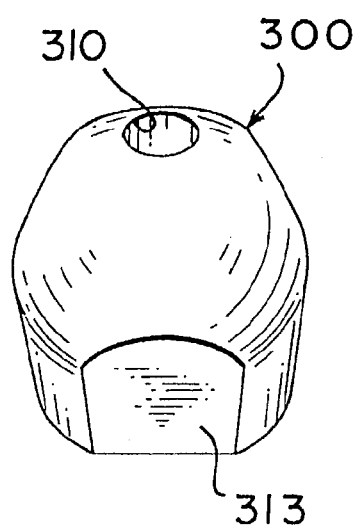
Figure 14H:
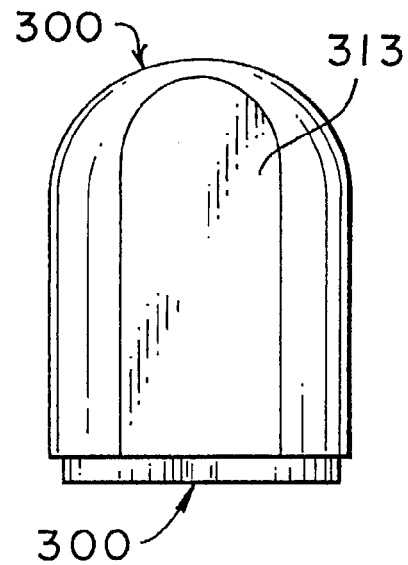
FIG. 14H is a plan view of one side of the bottom member of FIG. 14A.
Figure 14I:
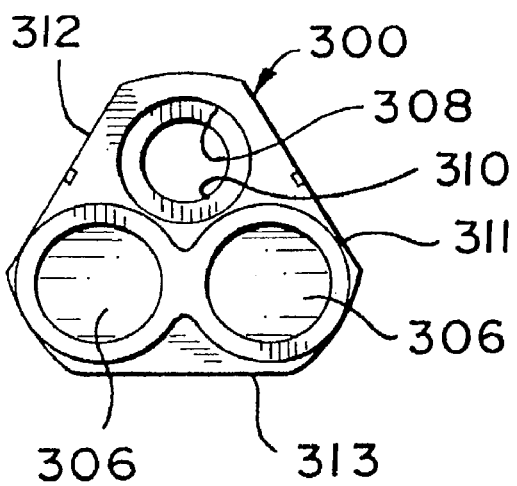
FIGS. 14I and 14J are end views of the bottom member of FIG. 14A.
Figure 14J:
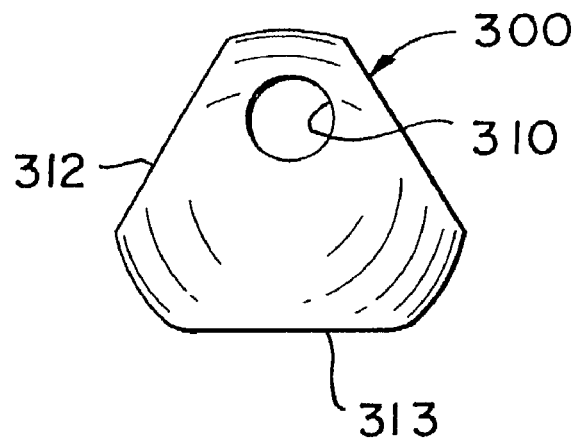
Figure 14K:
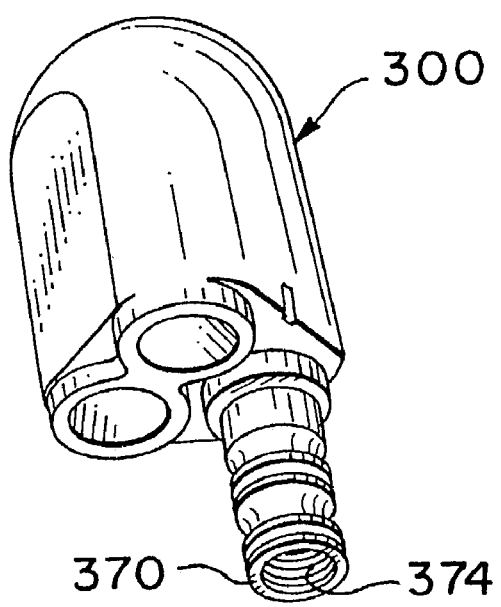
FIG. 14K shows the bottom member of FIG. 14A with a coil tubing connector installed therein.

As shown in FIG. 14D, the body 302 has flattened sides 311, 312, and 313 so that fluid flow is possible between the exterior surfaces of these sides and the interior surface SF of a wellbore (shown in dotted lines in FIG. 14D). Such a configuration of these sides inhibits formation of a fluid hydraulic lock of the bottom member in a wellbore containing fluid.

Figure 14N:
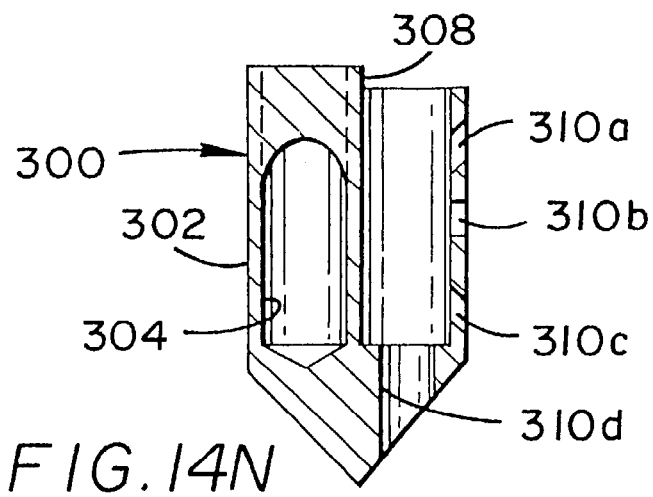
FIG. 14N is a perspective view of a heat loop bottom member according to the present invention.

Optionally, the bottom member 300 may have one or more bores 310 in fluid communication with the bore 308. Fluid, e.g. grout, filler material, drilling fluid and/or water, etc., may be selectively pumped through the coil tubing, through the bore 308, and through the bore 310. Optionally, as shown in FIG. 14N, the bottom member 300 (and any bottom member disclosed herein) may have one or more bores 310a, 310b and/or 310c in fluid communication with the bore 308, with or without the bore 310d (which is like the bore 310 described above). It is within the scope of this invention for the bore 310 to be canted from the vertical as viewed in the figures in which it appears. Such additional bore or bores 310a, 310b, and/or 310c can facilitate the entry of the bottom member into an amount of drilling fluid or into an amount of drilling fluid and drilled cuttings; or into an amount of bore filler—when fluid is pumped through them. Fluid, e.g. grout, filler material, drilling fluid and/or water, etc., may be selectively pumped through the coil tubing, through the bore 308, and through the bore 310. As shown in FIG. 14N, the bottom member has a conical bottom nose 15. Alternatively, e.g. as with the bottom members of FIGS. 14A and 15A, this nose may be rounded; or, in another aspect, it may have two or more sides that meet along a line forming a point at the bottom of the nose. In one aspect the bottom nose may be an inverted three-sided or four-sided polygonal solid (e.g. a pyramid) with the apex pointing down. With the lower end of the coil tubing secured above the bore 310a, fluid is pumpable out from the or all the bores. Alternatively, if a connector is used as in FIG. 14K, holes can be provided in the connector corresponding in position to the bore(s) so that fluid is flowable through the connector to the bore(s).

FIGS. 14A–15C show designs of a bottom member according to the present invention.

Figures 15A, 15B:
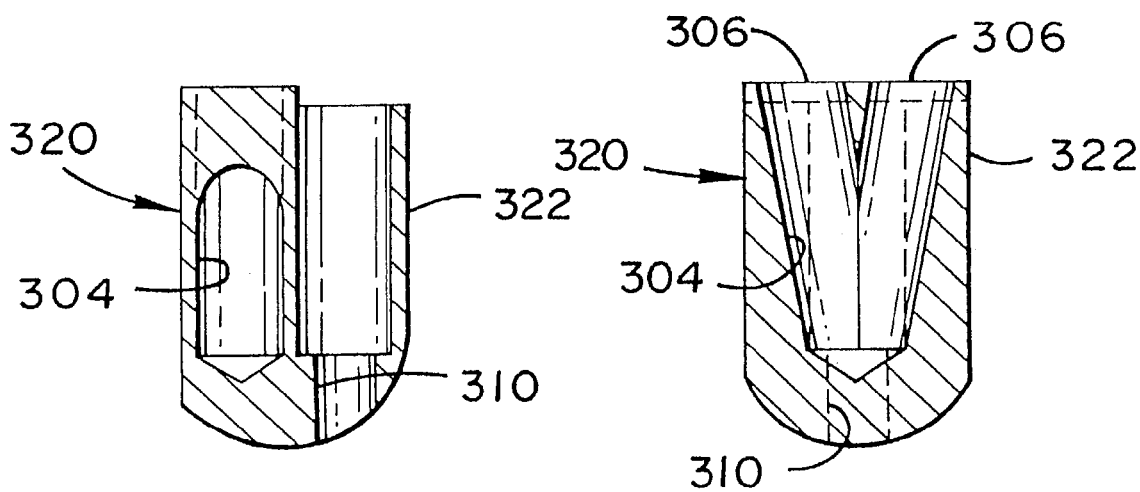
FIG. 15A is a side cross-section view of a heat loop bottom member according to the present invention.
FIG. 15B is a front cross-section view.
Figure 15C:
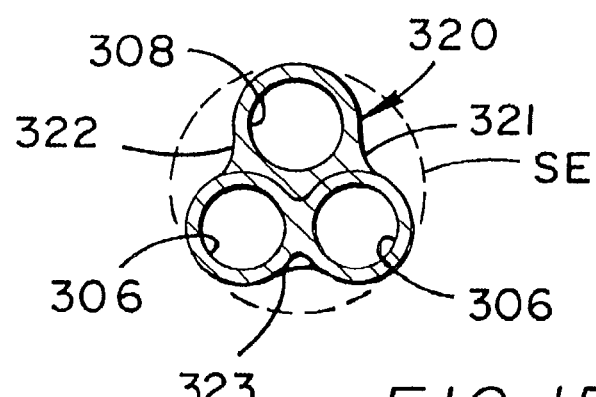
FIG. 15C is a top cross-section view of the bottom member of FIG. 15A.

FIGS. 15A–15C show a bottom member 320 with a body 322 according to the present invention which is like the bottom member 300, but has sides 321, 322, 323 that are further recessed than the sides 311, 312, 313 of the bottom member 300, providing an even larger fluid flow path past the bottom member between its sides and an interior surface SE of a wellbore. Other parts of the bottom member 320 are like those of the bottom member 300 and the same numerals are used to indicate these parts.

Coil tubing is releasably secured in the bore 308 with a friction fit and/or snap fit and/or glue and heat loop pipe ends can be secured in the openings 306 with epoxy and/or with a heat fusing process. Alternatively, a coil tubing connector 370 (see FIGS. 14K–14M) is releasably held in the bore 308 e.g. with a friction fit and/or snap fit. A ridge 371 on the connector 370 provides a stop member for abutting a top surface of a bottom member. A flow bore 374 extends through the connector 370.

Figure 16B:
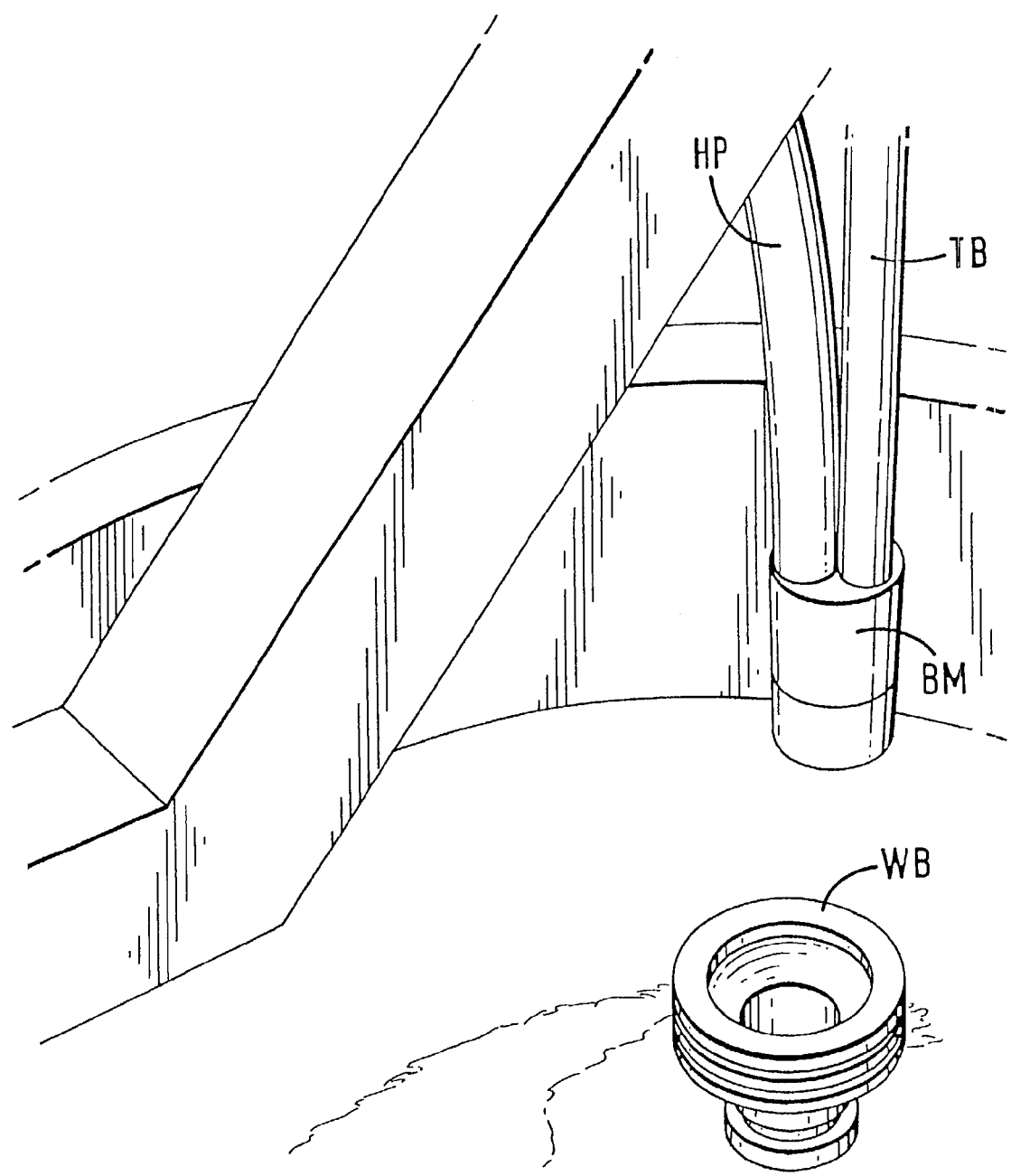
FIG. 16B is a top perspective view showing a top of a wellbore above which is the system of FIG. 16A.

FIGS. 16A and 16B show a heat loop installation system ST according to the present invention with a roll of polyethylene heat loop pipes RL in a cage CG and a coil tubing injector CJ injecting coil tubing TB with heat loop pipes HP into a wellbore WB. A bottom member BM has ends of heat loop pipes HP secured therein and an end of the coil tubing CT is also secured thereto. The bottom member BM has internal bores like those of the previously described bottom members. The cage CG can be made, preferably, of aluminum, steel, or plastic.

Figure 17:
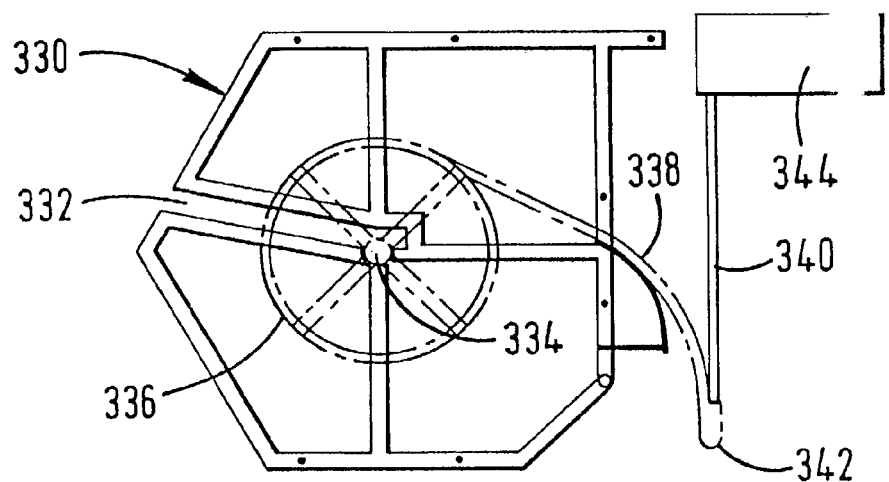
FIG. 17 is a side view of a spool apparatus according to the present invention.

FIG. 17 shows a cage 330 that may be used with the system ST of FIG. 16A instead of the cage CG. The cage 330 has two side grooves 332 (one shown in FIG. 17; the other spaced-apart from and opposite the one shown) which releasably receive and hold projecting ends of an axle 334 of a spool 336 (made, e.g. of steel, aluminum or plastic). Heat loop pipes 338 are wound on the spool 336 and have their lower ends 339 secured in a bottom member 342 (like the previously described bottom members. The heat loop pipes 338 unwind from the spool 336 as coil tubing 340 connected to the bottom member 342 is injected by a coil tubing injection system 344 (shown schematically) into a heat loop wellbore.

Figure 18A:
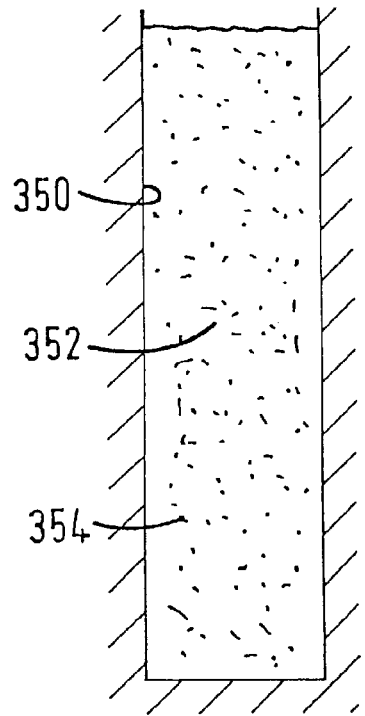
FIGS. 18A–18C are schematic side views illustrating steps in a method according to the present invention.
Figure 18B:
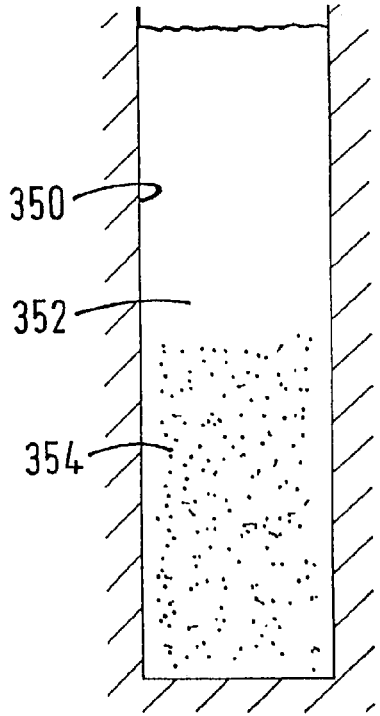

FIG. 18A illustrates a heat loop wellbore 350 which contains an amount of drilling fluid 352 which contains some solids 354 (e.g. but not limited to, drilled cuttings and/or drilling fluid solids) 354. As shown in FIG. 18B, the particles of solids 354 have, over time, settled out and down collecting in a bottom area of the bore 350.

Figure 18C:
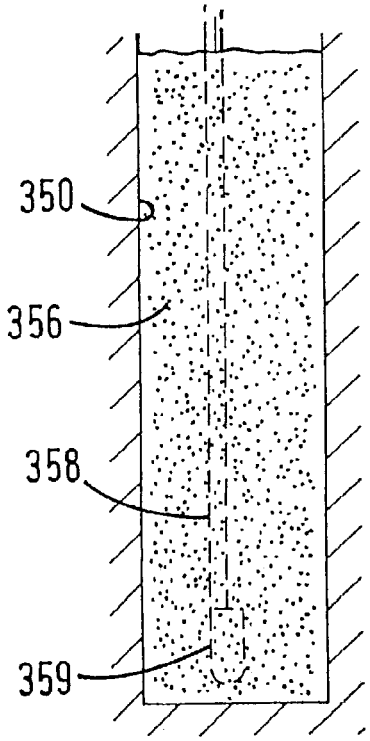

FIG. 18C illustrates the wellbore 350 following injection of a solids-containing polymer-containing filler material 356 according to the present invention into the bore 350 as shown in FIG. 18B. Suspension of the particles of solids 354 is maintained by the material 356. It is also possible for a bottom member (like those of FIGS. 14A, 15A) to jet down through the collected settled out material (FIG. 18B) to position the bottom member near the bottom of the bore 350 and then filler material 356 can be pumped into the bore 350 as the coil tubing initially connected to the bottom member is disconnected and raised, all the while pumping material 356 into the bore 350 and mixing it with the material 354. In one aspect, as shown in FIG. 18C, a heat loop system 358 (shown in dotted lines) with a bottom member 359 (as any disclosed herein but preferably with one or more fluid ports for jetting out fluid) is left in the bore 350.

Figure 19:
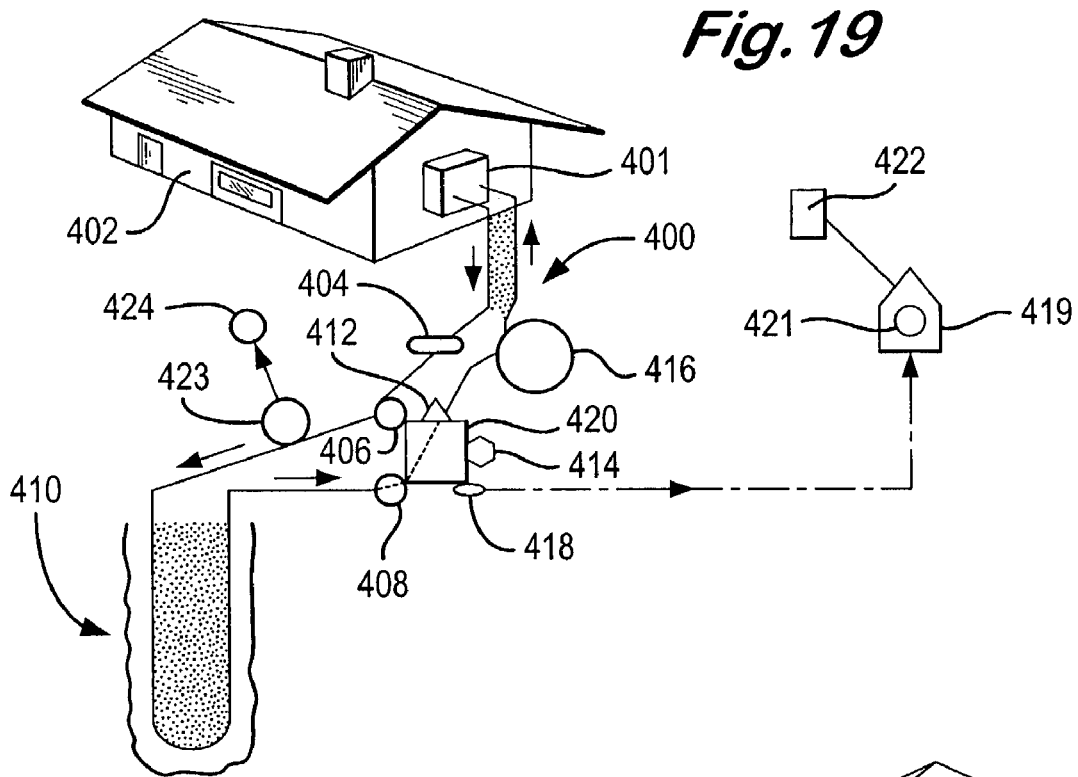
FIGS. 19, 20, and 21 are schematic views of systems according to the present invention.

FIG. 19 discloses a system 400 according to the present invention which provides temperature treated fluid to a heating/cooling system 401 in or on a facility 402. The system 401 may include a heat pump system and/or a water heater within the facility. A pump 404 pumps temperature transfer fluid, e.g. but not limited to water, from the system 401 to a ground loop temperature transfer system 410 in the earth. A temperature sensor 406 of a metering system 420 measures the temperature of the temperature transfer fluid ("fluid").

The fluid with a changed temperature exits the transfer system 410 flows back to the metering system 420. A temperature sensor 408 of the system 420 senses the temperature of the fluid that has exited from the transfer system 410. A flow sensor 412 measures the volume of fluid flow through he system.

The sensors 406, 408, and 412 are electronically interconnected with a calculator unit 414 of the metering system 420. Signals from the temperature sensors 406, 408 indicative of fluid temperature are received in, recorded by and processed by the calculator unit 414, as are signals from the flow sensor 412 indicative of flow volume. The calculator unit may be any suitable calculating device or computer. The calculator unit 414 calculates the amount of energy transferred in the transfer system 410, which amount of energy is supplied to a heat pump 416 which is an optional part of the system 401 of the facility 402. In one particular aspect the heat pump 416 is a geothermal heat pump. A transmitter 418 interconnected with the metering system 420 transmits data and/or calculation results from the metering system 420 to another location, e.g., but not limited to, a central processing facility 419 that includes appropriate invoice production apparatus 421 that produces an invoice 422 for an end user of the energy, e.g. the owner or tenant of the facility 402.

Figure 20:
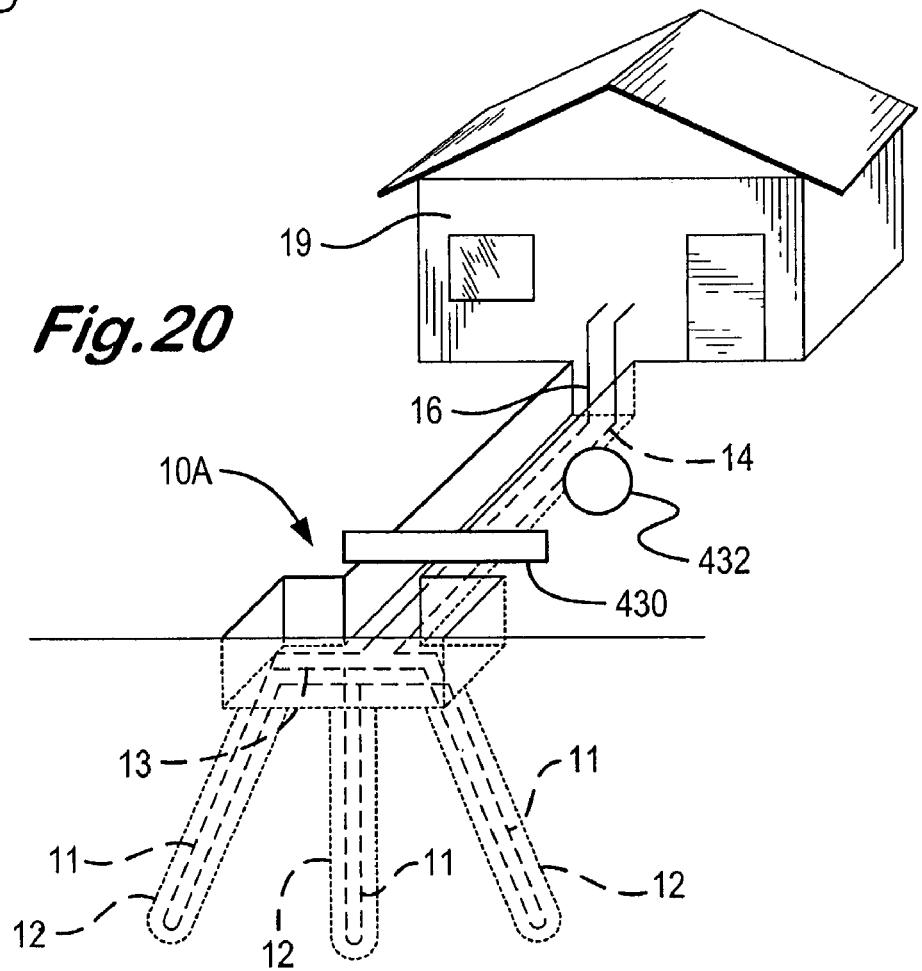

FIG. 20 shows a system 10A according to the present invention which is like the system 10 (FIG. 3) and like numerals indicate like components. The system 10A includes a plurality of loops 11 in wellbores 12. A metering system 430 is like the metering system 420 (FIG. 19) and performs the functions of the metering system 420. The heat pump 432 is like the heat pump 416 (FIG. 19). As with the system 400, the system 10A can calculate the amount of energy supplied from the loops 11. It is within the scope of this invention to use any suitable ground energy transfer system which is "metered" and "invoiced" as described below, including, but not limited to, loop systems as described herein and including, but not limited to, any ground heat exchange system as described in the prior art cited in this case.

In one method according to the present invention using a system, e.g. but not limited to, like the systems of FIGS. 19 and 20, an end user of energy produced by the system is billed for the amount of energy provided by or transferred by the system and/or the amount of heat provided to the end user or extracted for the end user. The calculated amount of energy used is manually ascertained from the metering system and/or is transmitted to a main processing apparatus. Any system according to the present invention may use any suitable system, device, or apparatus for extracting heat (including, but not limited to, waste heat) from within a facility to be introduced into an output line that conveys heat transfer fluid to an earth loop system as disclosed herein. Such suitable systems, devices or apparatuses include, but are not limited to, water heating systems, desuperheaters, and known heat exchange apparatuses and systems. Based on a calculated amount, an invoice is produced for the end user.

An optional heat exchange system 423 on the output line from the facility 402 may be used to transfer heat from the heat transfer fluid flowing in the output line to another item 424. The system 423 may be any suitable known heat exchanger or series of heat exchangers. The item 424 may be any suitable heat sink that can receive the heat from the system 423 or any item that can use the heat, including but not limited to an appliance, machine, facility, device, turbine, mass of water (e.g. in a pool), etc. Thus at least some of the heat extracted from the facility (or substantially all of it) does not flow back into the earth. In certain particular aspects the system 423 is a direct heat exchange system, including, but not limited to a pipe or pipes (e.g. plastic, metal, or fiberglass) in a mass of water (e.g. a pond, lake, or pool) or running under pavement.

The system 423 may be located anywhere on the output line between the facility 402 and the loop's input to the earth.

The temperature sensors may be located anywhere on their respective lines, including, but not limited to: at the input and output of the loop system; at the output of the loops system and the point at which the line exits from the facility; and/or at the point at which the loop output line enters the facility and the point at which the loop input line (which is the facility output line) exits from the facility.

Figure 21:
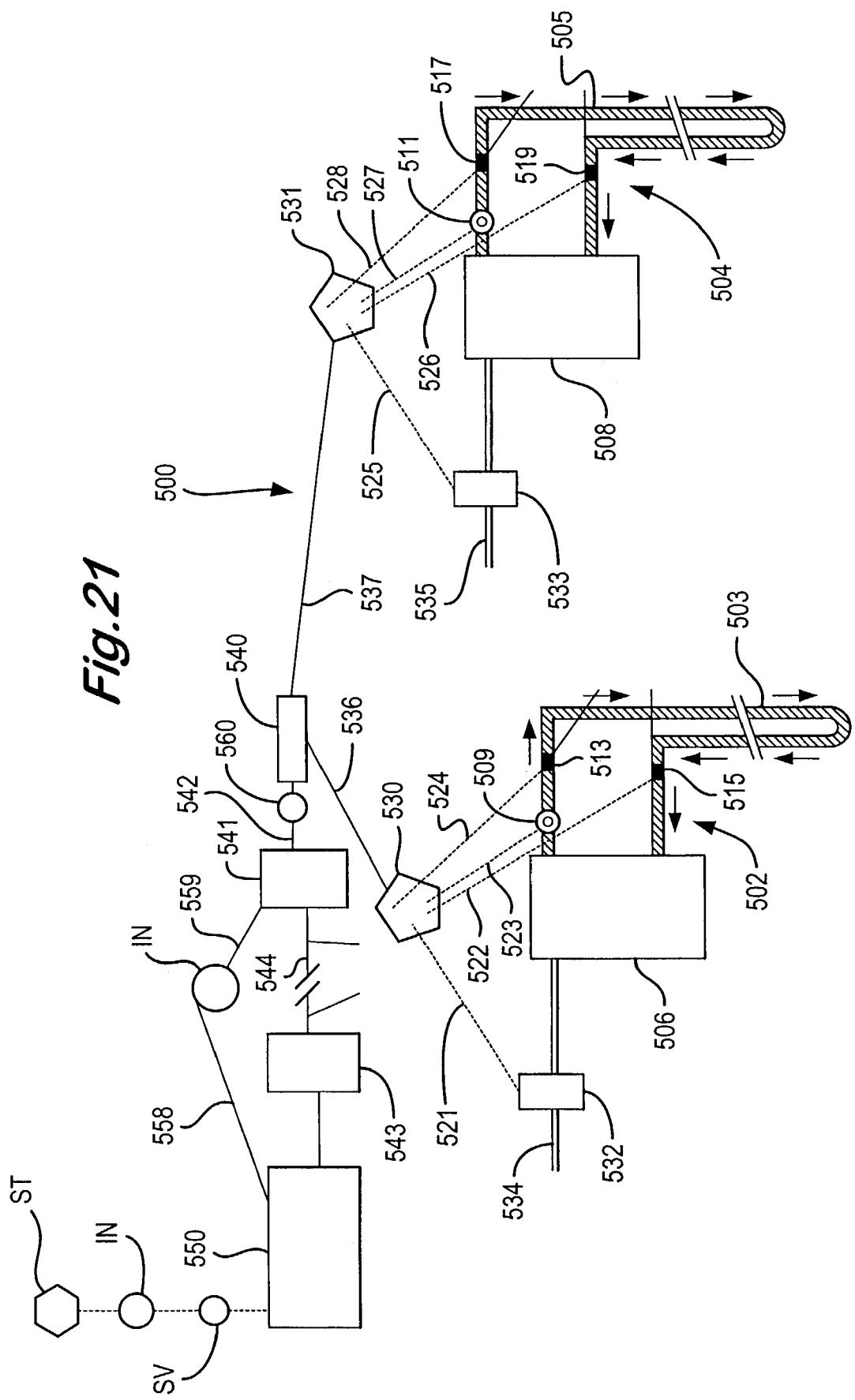

FIG. 21 shows a system 500 according to the present invention which has two ground heat exchange system 502 and 504 which may be any known ground heat exchange system. In one aspect the systems 502, 504 are ground loop systems as any described herein. The system 500 is for a structure, e.g. a building, e.g. a restaurant that has a customer area and a kitchen area. For example, the system 502 may provide heat exchange capability for the kitchen area and the typical apparatuses and devices used there, e.g. appliances, ice machines, etc; and the system 504 may provide heat exchange for a heat/cooling system(s) for the customer area.

In one aspect the system 502 has a heat pump 506 and the system 504 has a heat pump 508, each heat pump disposed in heat exchange relation with a corresponding ground loop (or loops) 503, 505 respectively. Arrows indicate flow direction in the loops.

Each loop 503, 505 has a water flow meter 509, 511, respectively; and two temperature sensor probes 513, 515 and 517, 519, respectively. Via appropriate lines and connections 521, 522, 523, 524 and 525, 526, 527,528, energy meters 530, 531 (optionally with internal batteries for power) communicate with their associated water flow meter, temperature sensor probes, and kilowatt meters 532, 533, respectively. Each meter may include its own calculating apparatus and signal transmission apparatus for transmitting signals indicative of data and of calculated results. Input AC power (e.g. typical 460 VAC-3 phase or 230 VAC-3 phase) metered by the meters 532,533 for running the heat pumps is provided via power lines 534, 535. The meters 532, 533 measure and record the energy being consumed by the heat pump(s) and transmit a signal indicative of this data to the energy meters 530, 531 respectively. The energy meters 530, 531 store this data and further transmit it to the computer 550 upon being queried by the computer.

Cables 536, 537 provide communication between the energy meters 530, 531, respectively, and an interface unit 540 with circuitry and devices for "directing traffic", i.e., routing the information flow between the computer 550 and the energy meters 530, 531, between a computer 550 and the energy meters. The interface unit 540 communicates with a modem 541 via a cable 542. The modem 541 communicates with a modem 543 via a telephone line 544. The modem 543, in turn, communicates with a system e.g. the Internet IN, via the computer 550 and a phone line 558. The interface units and modems may be run on typical 115 VAC-1 phase electrical power, with appropriate transformers as needed. Alternatively, as shown with dotted lines to the left in FIG. 21, a server SV communicates with the Internet IN and a customer ST communicates with the Internet IN to query the computer 550 via the server SV. Also, interface unit 540 via an optional computer 560 and the modem 541 can communicate with the Internet IN.

The kilowatt meters 532, 533 measure power to the heat pumps (primarily to their compressors and fans). The energy meters 530, 531 receive inputs from the temperature probes and from the flow meters to calculate kilowatts transferred. The computer collects and records the data from all meters. Optionally, the collected data either from the meters, from the interface units, or from the computer can be sent ("dumped") to a server or other appropriate apparatus, on-site or remote, e.g. via the Internet to a remote server. This data is, in this way, available for access by anyone with access to the server and, in one aspect, anyone with access to the Internet. In one aspect the temperature probes 515, 519 collect, store, calculate and analyze ("treat") data regarding the temperature of heat transfer fluid (e.g. water) entering the system. Similarly, the temperature probes 513, 517 treat data regarding the temperature of water exiting the system. The flow meters treat data regarding water flow volume from the flow meters 509, 511 over a time interval (e.g., but not limited to, 5, 10 15, 30, 45 or 60 seconds). Calculator apparatus in the energy meters 506, 508 provided with the data from the probes and flow meters, calculate and store data regarding change in energy (energy extracted from or transferred to the heat transfer fluid) due to the change in temperature of a specific volume of water entering and exiting the system in a specific time period. The interface units act as routers allowing the computer 550 (on-site or remote) to query each individual energy meter (via the modems 543, 541 and phone line 544 in one embodiment) regarding its calculations and stored data. The computer 550 may communicate with the interface unit 540 via the Internet IN. Via a connection to another entity or server on the Internet IN, anyone, including but not limited to an owner or manager of the restaurant or an owner of the system 500 can review system performance on an almost-instantaneous basis. Each meter's recorded data output and each sensor probe's recorded data output, as well as any data stored in and any calculations done by the computer will be available for review by various persons and/or related systems via direct access to the computer 550 (e.g. by phone line or wireless communication) and/or via access via the Internet IN. For example any person, including but not limited to a customer CT such as the restaurant owner, can be provided with a detailed record, e.g. on the restaurant's or owner's computer monitor screen or in email of the amount of energy used by the heat pump (e.g. in Btu's, kwh's, therms, calories, etc.); the amount of energy supplied by the electric company; when the energy was consumed; which heat pump consumed the energy; and in which area the energy was consumed. It is to be understood that although the system 600 is described for a restaurant, it is within the scope of this invention to provide such a system for any business or building.

The present invention, in certain embodiments, discloses a wellbore heat loop system with a heat loop wellbore in the earth extending from an earth surface down into the earth to a bottom of the wellbore, a heat loop disposed in the heat loop wellbore and extending down to a position near the bottom thereof, the heat loop made of heat loop pipe, filler material around the heat loop in the wellbore, wherein the filler material is a gel mixture with an amount of water, and an amount of a gel material mixed with the water forming a gelled mixture.

The present invention, in certain embodiments, discloses a wellbore heat loop system with a heat loop wellbore in the earth extending from an earth surface down into the earth to a bottom of the wellbore, a heat loop disposed in the heat loop wellbore and extending down to a position near the bottom thereof, the heat loop comprised of heat loop pipe and a bottom member, the heat loop pipe extending down to the bottom member on one side thereof and up from the bottom member on another side thereof, the bottom member having a body, a first bore through the body extending from a first opening of the body to a second opening of the body, the first opening and the second opening each sized and configured for receipt therein of an end of heat loop pipe, a second bore having at least one opening on the body, the second bore sized and configured for securement thereat of an end of coil tubing. Such a system may have one, some, or all of the following: coil tubing releasably secured to the bottom member; filler material around the heat loop in the wellbore, preferably filling the wellbore and/or completely encompassing the heat loop; the filler material being a gel mixture with an amount of water, an amount of a gel material mixed with the water forming a gelled mixture; wherein the gel material is a polymer and the polymer and water are present, by weight, in the ranges of polymer— between about 0.5% and about 5.0% and water—between about 99.5% and about 0.5%, wherein the filler material is a mixture of polymer, thermally conductive solids and water, the thermally conductive solids suspended in and disbursed homogeneously throughout the polymer and water; wherein the polymer, water, and solids are present, by weight, in the ranges of polymer—about 0.3% to about 5%, water—about 25% to about 50%, and solids—about 50% to about 80%; and wherein the filler material has a thermal conductivity of at least 1.4.

The present invention, in certain embodiments, discloses a filler material for a heat loop wellbore, the filler material including a gel with an amount of water, and an amount of a gel material mixed with the water forming a gelled mixture; wherein the gel material is a polymer; wherein the polymer is a rehydrateable polymer; wherein the filler material includes an amount of thermally conductive solids, and in one aspect sufficient solids to effect a thermal conductivity of filler within a wellbore of at least 1.2 or at least 1.4, the material encompassing a heat loop in the wellbore; wherein the polymer and water are present, by weight, in the ranges of polymer—between about 0.5% and about 5.0%, and water—between about 99.5% and about 0.5%; the polymer, solids and water are present, by weight, in the ranges of polymer—about 0.3% to about 5%, water— about 25% to about 50%, and solids—about 50% to about 80%.

The present invention, in certain embodiments, discloses a bottom member for an earth bore heat loop system, the bottom member having a body, a first bore through the body extending from a first opening of the body to a second opening of the body, the first opening and the second opening each sized and configured for receipt therein of an end of heat loop pipe, a second bore having at least one opening on the body, the second bore sized and configured for securement thereat of an end of coil tubing; and, preferably at least one fluid exit port in fluid communication with the second bore, e.g. for providing jetted fluid from the bottom member.

The present invention, in certain embodiments, discloses a method for emplacing filler material in an earth heat loop wellbore, the method including installing a heat loop in an earth heat loop wellbore with coil tubing using a wellbore heat loop system as disclosed herein, and such a method using filler material as disclosed herein which, in one aspect, has an amount of water, and an amount of a gel material mixed with the water forming a gelled mixture. In another aspect an effective amount of thermally conductive solids are dispersed throughout, preferably homogeneously, and suspended within the gelled mixture producing an overall thermal conductivity for the filler material in the wellbore of at least 1.2 or at least 1.4.

The present invention, therefore, in some, but not necessarily all, embodiments, provides an earth energy loop transfer system with a moving energy transfer fluid, the system for transferring energy for an entity, the system including apparatus and/or system(s) for measuring an amount of energy transferred for the entity to or from the moving energy transfer fluid, and apparatus and/or system(s) for invoicing the entity for the amount of energy transferred. Such a system may have any one or some (in any possible combination) of the following: apparatus and/or system(s) for calculating a price for the amount of energy transferred, said invoicing based on said price; apparatus and/or system(s) for transmitting a signal indicative of a measured amount of energy transferred from the apparatus and/or system(s) for measuring to the apparatus and/or system(s) for invoicing; wherein the earth energy loop transfer system includes a loop wellbore in the earth extending from an earth surface down into the earth to a bottom of the wellbore, a loop disposed in the loop wellbore and extending down to a position therein, the loop comprised of lop pipe, the loop having a fluid input end and a fluid output end, an input line in fluid communication with input end of the loop and in fluid communication with a facility of the entity's, an output line in fluid communication with the output end of the loop and in fluid communication with the facility of the entity's, the earth energy loop system further including a metering system for measuring the volume of energy transfer fluid flowing through the system between the loop and the facility; wherein the metering system includes at least two temperature sensors for sensing temperature of energy transfer fluid, one for the input line and one for the output line, for measuring the temperature of energy transfer fluid input into the loop and the temperature of energy transfer fluid exiting the loop; wherein the metering system includes at least two temperature sensors for measuring temperature of energy transfer fluid including at least a first temperature sensor and a second temperature sensor, the first temperature sensor located at a point at which the output line enters the facility of the entity for measuring temperature of energy transfer fluid entering the facility and second temperature sensor location at a point at which the input line exits from the facility of the entity for measuring temperature of energy transfer fluid exiting the facility; wherein the apparatus and/or system(s) for invoicing is remote from the apparatus and/or system(s) for measuring; the apparatus and/or system(s) for invoicing including apparatus and/or system(s) for producing an invoice; the apparatus and/or system(s) for invoicing including apparatus and/or system(s) for sending the invoice to the entity; wherein the earth energy loop transfer system has a loop in the earth with an input end and input line in fluid communication therewith and the system further includes apparatus and/or system(s) for extracting heat from the input line, the means for extracting heat from the input line located between a facility of the entity's and an earth input of the earth energy loop transfer system so that heat extracted by the means for extracting heat from the input line is not introduced into the earth via the earth energy loop transfer system, and apparatus and/or system(s) in the facility for extracting heat from the facility and transferring the heat to energy transfer fluid in the input line; apparatus and/or system(s) for transferring heat extracted from the input line to another item; wherein the another item is from the group consisting of a heat sink, a heat using apparatus, and a heater; a heat pump system for a facility of the entity's, the heat pump system in fluid communication with an energy transfer fluid flowing from an earth loop of the earth energy loop transfer system; wherein the earth energy loop transfer system has a loop wellbore in the earth extending from an earth surface down into the earth to a bottom of the wellbore, a loop disposed in the loop wellbore and extending down to a position near the bottom thereof, the loop comprised of loop pipe, filler material around the loop in the wellbore, the filler material including comprising a gel with an amount of water, and an amount of a gel material mixed with the water forming a gelled mixture; and/or wherein the earth energy loop transfer system has a loop wellbore in the earth extending from an earth surface down into the earth to a bottom of the wellbore, a loop disposed in the loop wellbore and extending down to a position near the bottom thereof, the loop comprised of loop pipe and a bottom member, the loop pipe extending down to the bottom member on one side thereof and up from the bottom member on another side thereof, the bottom member including a body, a first bore through the body extending from a first opening of the body to a second opening of the body, the first opening and the second opening each sized and configured for receipt therein of an end of loop pipe, and a second bore having at least one opening on the body, the second bore sized and configured for securement thereat of an end of coil tubing.

The present invention, therefore, in some, but not necessarily all, embodiments, provides a method for providing energy transfer services to an entity, the entity having a facility to or from which energy is to be transferred, the method including transferring an amount of energy for the facility with an earth energy loop transfer system, the earth energy loop transfer system including apparatus and/or system(s) for measuring an amount of energy transferred for the entity to or from a moving energy transfer fluid, and apparatus and/or system(s) for invoicing the entity for the amount of energy transferred, measuring and/or calculating from temperature and flow measurements the amount of energy transferred, and invoicing the entity for the amount of energy transferred. Such a method may have one or some (in any possible combination) of the following: wherein the earth energy loop system also has a metering system for measuring the volume of energy transfer fluid flowing through the system between the loop and the facility, the method also including measuring the volume of energy transfer fluid flowing through the system between the loop and the facility; wherein the earth energy loop transfer system has a loop wellbore in the earth extending from an earth surface down into the earth to a bottom of the wellbore, a loop disposed in the loop wellbore and extending down to a position near the bottom thereof, the loop comprised of loop pipe, filler material around the loop in the wellbore, the filler material comprising a gel comprising an amount of water, an amount of a gel material mixed with the water forming a gelled mixture; wherein the earth energy loop transfer system has a loop wellbore in the earth extending from an earth surface down into the earth to a bottom of the wellbore, a loop disposed in the loop wellbore and extending down to a position near the bottom thereof, the loop of loop pipe and a bottom member, the loop pipe extending down to the bottom member on one side thereof and up from the bottom member on another side thereof, the bottom member having a body, a first bore through the body extending from a first opening of the body to a second opening of the body, the first opening and the second opening each sized and configured for receipt therein of an end of loop pipe, and a second bore having at least one opening on the body, the second bore sized and configured for securement thereat of an end of coil tubing; and/or wherein the metering system includes at least two temperature sensors for measuring temperature of energy transfer fluid including at least a first temperature sensor and a second temperature sensor, the first temperature sensor located at a point at which the energy transfer fluid exits the earth loop or a point at which the output line enters the facility of the entity for measuring temperature of energy transfer fluid entering the facility, and second temperature sensor located at a point at which energy transfer fluid enters the earth loop or a point at which the input line exits from the facility of the entity for measuring temperature of energy transfer fluid exiting the facility, the method including measuring temperature of energy transfer fluid entering and exiting the facility.

A "facility" herein may be a building. In other aspects it may be but is not limited to, a factory, a machine, or an item or apparatus that needs to be cooled and/or heated.

The present invention, therefore, in some, but not necessarily all embodiments, provides an earth energy transfer system with a moving energy transfer fluid for transferring energy with respect to the earth, the system for transferring energy for an entity, the system including apparatus for measuring an amount of energy transferred for the entity to or from the moving energy transfer fluid, and apparatus for invoicing the entity for the amount of energy transferred. Such a system may include one or some of the following in any possible combination: apparatus for calculating a price for the amount of energy transferred, said invoicing based on said price; apparatus for transmitting a signal indicative of a measured amount of energy transferred from the means for measuring to the means for invoicing; wherein the earth energy transfer system is a loop system that includes a loop wellbore in the earth extending from an earth surface down into the earth to a bottom of the wellbore, a loop disposed in the loop wellbore and extending down to a position therein, the loop comprised of loop pipe, the loop having a fluid input end and a fluid output end, an input line in fluid communication with input end of the loop and in fluid communication with a facility of the entity's, an output line in fluid communication with the output end of the loop and in fluid communication with the facility of the entity's, the earth energy loop system including a metering system for measuring the volume of energy transfer fluid flowing through the system between the loop and the facility; wherein the metering system includes at least two temperature sensors for sensing temperature of energy transfer fluid, one for the input line and one for the output line, for measuring the temperature of energy-transfer fluid input into the loop and the temperature of energy transfer fluid exiting the loop; wherein the metering system includes at least two temperature sensors for measuring temperature of energy transfer fluid including at least a first temperature sensor and a second temperature sensor, the first temperature sensor located at a point at which the output line enters the facility of the entity for measuring temperature of energy transfer fluid entering the facility and second temperature sensor location at a point at which the input line exits from the facility of the entity for measuring temperature of energy transfer fluid exiting the facility; wherein the apparatus for invoicing is remote from the apparatus for measuring; the apparatus for invoicing including apparatus for producing an invoice; the apparatus for invoicing including apparatus for sending the invoice to the entity; wherein the earth energy transfer system has a in the earth with an input end and input line in fluid communication therewith and the system including apparatus for extracting heat from the input line, the apparatus for extracting heat from the input line located between a facility of the entity's and an earth input of the earth energy transfer system so that heat extracted by the apparatus for extracting heat from the input line is not introduced into the earth via the earth energy transfer system, and apparatus in the facility for extracting heat from the facility and transferring the heat to energy transfer fluid in the input line; apparatus for transferring heat extracted from the input line to another item; wherein the another item is from the group consisting of a heat sink, a heat using apparatus, and a heater; a heat pump system for a facility of the entity's, the heat pump system in fluid communication with an energy transfer fluid flowing from the earth energy transfer system; a loop wellbore in the earth extending from an earth surface down into the earth to a bottom of the wellbore, a loop disposed in the loop wellbore and extending down to a position near the bottom thereof, the loop comprised of loop pipe, filler material around the loop in the wellbore, the filler material including a gel with an amount of water, an amount of a gel material mixed with the water forming a gelled mixture; and/or wherein the earth energy transfer system has a loop wellbore in the earth extending from an earth surface down into the earth to a bottom of the wellbore, a loop disposed in the loop wellbore and extending down to a position near the bottom thereof, the loop comprised of loop pipe and a bottom member, the loop pipe extending down to the bottom member on one side thereof and up from the bottom member on another side thereof, the bottom member having a body, a first bore through the body extending from a first opening of the body to a second opening of the body, the first opening and the second opening each sized and configured for receipt therein of an end of loop pipe, and a second bore having at least one opening on the body, the second bore sized and configured for securement thereat of an end of coil tubing.

The present invention, therefore, in some, but not necessarily all embodiments, provides a method for providing energy transfer services to an entity, the entity having a facility to or from which energy is to be transferred with respect to the earth, the method including transferring an amount of energy for the facility with an earth energy transfer system, the earth energy transfer system including apparatus for measuring an amount of energy transferred for the entity to or from a moving energy transfer fluid, and apparatus for invoicing the entity for the amount of energy transferred, measuring the amount of energy transferred, and invoicing the entity for the amount of energy transferred. Such a method may include one or some of the following, in any possible combination: wherein the earth energy system further comprises a metering system for measuring the volume of energy transfer fluid flowing through the system and between the system and the facility, the method including measuring the volume of energy transfer fluid flowing through the system between the system and the facility; wherein the earth energy transfer system has a loop wellbore in the earth extending from an earth surface down into the earth to a bottom of the wellbore, a loop disposed in the loop wellbore and extending down to a position near the bottom thereof, the loop comprised of loop pipe, filler material around the loop in the wellbore, the filler material including comprising a gel with an amount of water, an amount of a gel material mixed with the water forming a gelled mixture; wherein the earth energy transfer system has a loop wellbore in the earth extending from an earth surface down into the earth to a bottom of the wellbore, a loop disposed in the loop wellbore and extending down to a position near the bottom thereof, the loop with a loop pipe and a bottom member, the loop pipe extending down to the bottom member on one side thereof and up from the bottom member on another side thereof, the bottom member having a body, a first bore through the body extending from a first opening of the body to a second opening of the body, the first opening and the second opening each sized and configured for receipt therein of an end of loop pipe, and a second bore having at least one opening on the body, the second bore sized and configured for securement thereat of an end of coil tubing; and/or wherein the metering system includes at least two temperature sensors for measuring temperature of energy transfer fluid including at least a first temperature sensor and a second temperature sensor, the first temperature sensor located at a point at which the output line enters the facility of the entity for measuring temperature of energy transfer fluid entering the facility and second temperature sensor located at a point at which the input line exits from the facility of the entity for measuring temperature of energy transfer fluid exiting the facility, the method including measuring temperature of energy transfer fluid entering and exiting the facility. In this and the preceding paragraph "apparatus" may include devices, things, computers, hardware, programs, and software for accomplishing a stated function.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112. The inventors may rely on the Doctrine of Equivalents to determine and assess the scope of their invention and of the claims that follow as they may pertain to apparatus not materially departing from, but outside of, the literal scope of the invention as set forth in the following claims.

What is claimed is:

1. A wellbore heat loop system comprising
a heat loop wellbore in the earth extending from an earth surface down into the earth,
a heat loop disposed in the heat loop wellbore, the heat loop comprised of heat loop pipe and a bottom member, the heat loop pipe extending member on another side thereof,
the bottom member comprising
a body,
a first bore through the body extending from a first opening of the body to a second opening of the body, the first opening and the second opening each sized and configured for receipt therein of an end of heat loop pipe,
a second bore having at least one opening on the body, the second bore sized and configured for securement thereat of an end of coil tubing, and
the second bore not in fluid communication with the first bore.

2. The energy system of claim 1 further comprising
communication means between the interface means and an internet system for communication between the interface means and the internet system,
server means in communication with and between the data means and the internet system, wherein the server means is able to receive information from the data means, interface means, and the measuring means, and wherein the server means provides communication via the internet system between a customer and the data means for the customer to query the data means regarding data therein.

3. The energy system of claim 2 further comprising means for calculating a price for the amount of energy transferred, said invoicing based on said price.

4. The energy system of claim 3 further comprising means for transmitting a signal indicative of a measured amount of energy transferred from the measuring means to the invoicing means.

5. The system of claim 3 further comprising the invoicing means including means for producing an invoice.

6. The energy system of claim 3 further comprising the invoicing, means including means for sending the invoice to the entity.

7. An energy system with a moving energy transfer fluid, the system for transferring via the moving energy transfer fluid energy between the earth and a facility, the system including an energy transfer system through which the moving energy transfer fluid moves to transfer energy between the earth end the facility, measuring means for measuring an amount of energy transferred between the earth and the facility, data means for collecting data from the measuring means, interface means between the measuring means and data means for routing information between the data means and the measuring means, at least one ground loop system, the moving energy transfer fluid moving through the at least one ground loop system, the at least one ground loop system comprising an earth energy loop transfer system including a loop wellbore in the earth extending from an earth surface down into the earth to a bottom of the wellbore, a loop disposed in the loop wellbore and extending down to a position therein, the loop comprised of loop pipe, the loop having a fluid input end and a fluid output end, an input line in fluid communication with input end of the loop and in fluid communication with the facility, an output line in fluid communication with the output end of the loop and in fluid communication with the facility, and means for invoicing an entity for the amount of energy transferred.

8. The energy system of claim 7 further comprising communication means between the interface means and an internet system for communication between the interface means and the internet system.

9. The energy system of claim 7 further comprising server means in communication with and between the data means and an internet system, the server means able to receive information from the data means, interface means, and the measuring means and wherein the server means provides communication via the internet system between a customer and the data means for the customer to query the data means regarding data therein.

10. The energy system of claim 7 further comprising means for calculating a price for the amount of energy transferred, said invoicing based on said price.

11. The energy system of claim 7 further comprising means for transmitting a signal indicative of a measured amount of energy transferred from the means for measuring to the means for invoicing.

12. An energy system with a moving energy transfer fluid, the system for transferring via the moving energy transfer fluid energy between the earth and a facility, the system including an energy transfer system through which the moving energy transfer fluid moves to transfer energy between the earth and the facility, measuring means for measuring an amount of energy transferred between the earth and the facility, data means for collecting data from the measuring means, interface means between the measuring means and data means for routing information between the data means and the measuring means, and at least one ground loop system, the moving energy transfer fluid moving through the at least one ground loop system.

13. The energy system of claim 12 further comprising communication means between the interface means and an internet system for communication between the interface means and the internet system.

14. The energy system of claim 12 further comprising server means in communication with and between the data means and an internet system.

15. The energy system of claim 14 wherein the server means provides communication via the internet system between a customer and the data means for the customer to query the data means regarding data therein.

16. The energy system of claim 12 further comprising means for invoicing an entity for the amount of energy transferred, and means for calculating a price for the amount of energy transferred, said invoicing based on said price.

17. The energy system of claim 16 further comprising means for transmitting a signal indicative of a measured amount of energy transferred from the means for measuring to the means for invoicing.

18. The energy system of claim 16 wherein the means for invoicing and the server means are both remote from the means for measuring.

19. The system of claim 16 further comprising the means for invoicing including means for producing an invoice, and the means for invoicing including means for sending the invoice to the entity.

* * * * *